(12) United States Patent
McDonald

(10) Patent No.: US 11,247,087 B2
(45) Date of Patent: Feb. 15, 2022

(54) AUTOMATED STRUCTURE AND CURTILAGE PROTECTION SYSTEM AND ASSOCIATED METHODS

(71) Applicant: Christopher Joel McDonald, Huntington Beach, CA (US)

(72) Inventor: Christopher Joel McDonald, Huntington Beach, CA (US)

(*) Notice: Subject to any disclaimer, the term of this patent is extended or adjusted under 35 U.S.C. 154(b) by 0 days.

(21) Appl. No.: 17/331,753

(22) Filed: May 27, 2021

(65) Prior Publication Data
US 2021/0283444 A1 Sep. 16, 2021

Related U.S. Application Data

(60) Provisional application No. 63/033,210, filed on Jun. 2, 2020.

(51) Int. Cl.
| | |
|---|---|
| A62C 37/36 | (2006.01) |
| G08B 25/10 | (2006.01) |
| A62C 3/02 | (2006.01) |
| G06F 3/0484 | (2013.01) |
| G08B 17/00 | (2006.01) |
| G06F 3/04847 | (2022.01) |

(52) U.S. Cl.
CPC ............ *A62C 37/04* (2013.01); *A62C 3/0214* (2013.01); *G06F 3/04847* (2013.01); *G08B 17/005* (2013.01); *G08B 25/10* (2013.01)

(58) Field of Classification Search
CPC ....... A62C 3/02; A62C 3/0214; A62C 3/0271; A62C 35/023; A62C 35/026; A62C 37/04; A62C 37/36; G06F 3/04847; G08B 17/005; G08G 25/10

USPC .............................................. 169/56, 60, 61
See application file for complete search history.

(56) References Cited

U.S. PATENT DOCUMENTS

| | | | | |
|---|---|---|---|---|
| 5,165,482 A | * | 11/1992 | Smagac | A62C 3/0214 169/13 |
| 5,931,233 A | * | 8/1999 | La Bonte | A62C 2/08 169/5 |
| 7,845,424 B1 | * | 12/2010 | Miller | A62C 35/15 169/13 |
| 2008/0000649 A1 | * | 1/2008 | Guirguis | A62C 3/0214 169/60 |
| 2010/0000743 A1 | * | 1/2010 | Cohen | A62C 3/0271 169/5 |

(Continued)

*Primary Examiner* — Cody J Lieuwen
(74) *Attorney, Agent, or Firm* — Stephen Bullock; Bullock Law

(57) ABSTRACT

Embodiments of the present invention are related to an automated structure and curtilage protection system including a mechanical system hub, a piped network, a plurality of spray nozzles, and a remote user control portal. The mechanical system hub includes at least one of a control center, a pump, a pressure tank, a plurality of controllable valves, and a chemical injector assembly. The system is structured to autonomously take system action depending on a hierarchy of preprogrammed threat levels. The system is also structured to autonomously deliver water at set time intervals onto a structure and curtilage when instruction sets corresponding to relative threat levels have been activated. The system is further structured to autonomously deliver chemically infused water solely onto a structure's curtilage for a set time interval when instruction sets corresponding to a relative threat level have been activated.

20 Claims, 35 Drawing Sheets

(56) References Cited

U.S. PATENT DOCUMENTS

2010/0070097 A1\* 3/2010 Morgenstern .......... A62C 37/40
              700/284
2015/0129245 A1\* 5/2015 Weber .................. A62C 3/0214
              169/46
2019/0351272 A1\* 11/2019 McClain ................ A62C 35/68

\* cited by examiner

FIG. 5I

| ACCESS LEVEL: 2 | | 04/01/2021 11:11 |
|---|---|---|
| LOAD CONTROL | OPERATION MODE | STATUS |
| 529 — SYSTEM MODE ............. | AUTO | AUTO |
| 530 — SYSTEM SINGLE RUN ....... | OFF | OFF |
| PUMP 1 .......................... | AUTO | OFF |
| SOLENOID 1 ................... | AUTO | OFF |
| SOLENOID 2 ................... | AUTO | OFF |

LOG OUT | STATUS | SETTINGS | ALARMS

FIG. 5J

ACCESS LEVEL: 2     04/01/2021   11:11

LOAD CONTROL    OPERATION MODE    STATUS
    AUTO
533 — SYSTEM SINGLE RUN OPERATION   [X]
    OFF
SCHEDULED OPERATION WILL OVERRIDE SINGLE RUN OPERATION     OFF
    OFF
STRUCTURE DEFENSE RUN TIME    PERIMETER DEFENSE RUN TIME     OFF
[1] MIN.    [1] MIN.
[START]   [CLOSE]   [START]

OVERVIEW | STATUS | SETTINGS | ALARMS

PID SETUP

541 — PROPORTIONAL GAIN ............... [0.00]
RANGE: 0.01 - 100.00

542 — INTEGRAL TIME ........................ [0.00]  S.
RANGE: 0.01 - 3000.00

543 — DIFFERENTIAL TIME ................. [0.00]  S.
RANGE: 0.01 - 3000.00

544 — DEADBAND .............................. [0.00]  PSI
INACTIVE RANGE
+/- THE SETPOINT PRESSURE

| OVERVIEW | STATUS | SETTINGS | ALARMS |

PRESSURE SETUP

545 —TRANSDUCER MAX RANGE ........ [0]  PSI

546 —TRANSDUCER RED FREQ .......... [0]  S.

547 —PRESSURE SETPOINT ................ [0]  PSI

| OVERVIEW | STATUS | SETTINGS | ALARMS |

FIG. 5R

| Hazard Level | Proximity | Local System Action |
|---|---|---|
| 0 | No Fire Danger | System vales are closed and system at constant 65 psi |
| 1 | Fire Radius 4 miles away | System takes first track with pure water flow to saturate roof for 5 continuous minutes at 1 hour intervals. (65 psi). second track remains closed. |
| 2 | Fire Radius 3 miles away | System takes first track with pure water flow to saturate roof for 5 continuous minutes at 1/2 hour intervals. (65 psi). Second track remains closed. |
| 3 | Fire Radius 2 miles away | System takes first track with pure water flow to saturate roof for 5 continuous minutes at 20- minute intervals. Second track closed (65 psi) |
| 4a | Fire Radius 1 miles away | System takes second track with fire retardant/water mixture to saturate the landscape perimeter for 5 minutes only. First track closed (65 psi) |
| 4b | Fire Radius 1 miles away | System resumes first track with pure water flow to saturate roof for 5 continuous minutes at 10- minute intervals. Second track closed (65 psi) |
| 5 | Fire Radius .5 miles away | System takes first track with pure water flow to saturate roof for 60 continuous minutes the resorts back to Level 4b second track closed (65 psi) |

FIG. 10

Configuration

Set the schedule for each danger level

Danger level 1 schedule
[ 5 minutes ▽ ]   [ Every 60 minutes ▽ ]

Danger level 2 schedule
[ 5 minutes ▽ ]   [ Every 30 minutes ▽ ]

Danger level 3 schedule
[ 5 minutes ▽ ]   [ Every 15 minutes ▽ ]

Danger level 4 schedule
[ 5 minutes ▽ ]   [ Every 10 minutes ▽ ]

Note: Danger Level 5 runs for. This cannot be modified from the portal

[ Save ]

Summary
Controls
Configuration
Notifications
Property Settings
Subscription
Manage Users Test Account ▽

FIG. 12B

AUTOMATED STRUCTURE AND CURTILAGE PROTECTION SYSTEM AND ASSOCIATED METHODS

RELATED APPLICATIONS

This application claims the benefit under 35 U.S.C. § 119(e) of U.S. Provisional Patent Application Ser. No. 63/033,210 titled Automated Roof Fire Suppression System filed on Jun. 2, 2020, the entire contents of which are incorporated herein by reference.

FIELD OF THE INVENTION

The present invention relates to systems and methods for protecting buildings and their surrounding area from hazards such as fire. More particularly, the present invention relates to a structure and curtilage protection system and associated methods.

BACKGROUND

Wildfires have become an increasing threat to human lives and property. In 2017 California alone experienced 7,117 documented wildfires that destroyed approximately 505,956 acres and cost approximately $18 billion dollars. Factors such as increasing temperatures, population growth, and perennial winds all contribute to the increased risk and severity of wildfires. Along with increased risk comes an increased need to protect buildings and their surrounding landscape that are in proximate danger. Proximate danger not only means in the direct line of the fire, but also within several miles of a wildfire due to the threat of embers. In fact, most property damage related to wildfires comes from drifting embers.

An ember is a small, heated piece of wood, coal or other material that accompanies a fire. Embers can burn as hot as the fire from which they arise. They are also lightweight, which enables the wind to carry them long distances without being extinguished. Therefore, embers travel from the fire and oftentimes land on a structure's roof or surrounding curtilage to cause property damage. There exists a need in the art for a system that autonomously and effectively protects property from wildfires. There exists a need in the art for an automated structure and curtilage protection system and associated methods.

This background is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to an automated structure and curtilage protection system including a mechanical system hub, a piped network, a plurality of spray nozzles, and a remote user control portal. The mechanical system hub may include at least one of a control center, a pump, a pressure tank, a plurality of controllable valves, and a chemical injector assembly. The automated structure and curtilage protection system may be structured to autonomously take system action depending on a hierarchy of preprogrammed threat levels. The system may be structured to autonomously deliver water at set time intervals onto a structure and curtilage when instruction sets corresponding to relative threat levels have been activated. Furthermore, the system may be structured to autonomously deliver chemically infused water solely onto the curtilage for a set time interval when instruction sets corresponding to a relative threat level have been activated.

The pump may be a variable speed pump structured to maintain, increase and decrease water pressure throughout the system depending on the preprogrammed threat level. In some embodiments the system may include a plurality of spray nozzle housings structured to support and protect the plurality of spray nozzles on the flat surface of a roof. Additionally, in some embodiments the system may include an M-Shaped flashing structured to secure a segment of the piped network on the ridge of a pitched roof while allowing the plurality of spray nozzles to extend through the exterior surface of the pitched roof ridge at an angle.

In some embodiments the mechanical system hub may further include at least one of a backup generator, a solar storage battery, and smart switch structured to transition the mechanical system hub to a backup power source. The control center may be structured to manage at least one pump and at least one controllable valve within the mechanical system hub to direct water through the piped network. Additionally, the control center may be preprogrammed to route water through different tracks of the piped network depending on a corresponding threat level within the hierarchy of threat levels. The control center may be structured to receive threat level activation instructions from a remote source.

In this embodiment, the control center may include a user interface structured to allow a user to override preprogrammed control center settings. Furthermore, a remote user control portal may be structured to provide remote system overrides, monitor and display local fire conditions, and communicate threat levels to a participating control center for system action and inaction based on the respective threat levels.

The automated structure and curtilage protection system may include the piped network infused into the interior wall and roof construction of a new structure. It may also include the piped network fixedly attached to an existing structure exterior. Furthermore, it may include faux gutter housing along a structure's walls and top hat pipe covering along a structure's roof constructed to match a structure's aesthetic features and conceal the piped network.

In some embodiments, the control center may be structured to keep all system valves closed when an initial threat level indicating an absence of threat has been communicated to the control center. It may open a first set of piped network valves within the mechanical system hub to autonomously deliver water to a structure's roof, eaves and curtilage when a first through third level, fourth sub level, and fifth level of threat have been communicated to the control center. It may also close the first set of piped network valves and open a second set of piped network valves within the mechanical system hub to autonomously deliver chemically infused water solely to the curtilage when an alternate fourth sub level has been communicated to the control center.

Another embodiment of the invention may include an automated structure and curtilage protection system including a mechanical system hub with a control center, a pump, a pressure tank, a plurality of automated valves, and a chemical injector assembly. It may include a piped network with the plurality of automated valves structured to create a first track operable to autonomously deliver only water to a structure's roof, eaves and curtilage. Furthermore, the plurality of automated valves may be structured to create a second track operable to autonomously deliver only chemically infused water solely to the curtilage. It may include a plurality of spray nozzles and a remote user control portal. The system may take system action depending on a hierarchy of preprogrammed threat levels. It may deliver water at set time intervals onto a structure and curtilage when instruction sets corresponding to relative threat levels have been activated. It may also autonomously deliver chemically infused water solely to the curtilage for a set time interval when instruction sets corresponding to a relative threat level have been activated. Furthermore, the control center and the remote user control portal may be structured to manually override instruction sets preprogrammed into the automated structure and curtilage protection system.

The remote user control portal may be operable to calculate and display current hazard threats and their distance from a structure utilizing the location of the structure and known data positioning points about the hazard relative to the location of the structure. The hazard dimensions and location may be updated and displayed on a user accessible map within the remote user control portal.

The user control portal may be structured to calculate a threat level based on a hazard's distance from a structure and communicate the threat level to the structure's control center to initiate preprogrammed action relative to the calculated threat level. It may be structured to provide a constant web-based monitor of the hazard and threat level that is operable to alert users of the current threat levels via at least one of text message, automated phone calls, email, and user login.

The user control portal may be structured to calculate the absence of a threat, categorize the absence of threat into an initial level, and transmit the corresponding threat level and instruction set to the control center to direct the plurality of automated valves closed.

The user control portal may also be structured to determine a threat based on calculated distance of a hazard from a structure as compared to a threshold distance, categorize the threat into a first level, and transmit the corresponding threat level and instruction set to the control center to direct open a section of the plurality of valves along the first track and guide water therethrough for a set duration at set time intervals.

Likewise, the user control portal may be structured to determine a threat based on calculated distance of a hazard from a structure as compared to a second threshold distance, categorize the threat into a second level, and transmit the corresponding threat level and instruction set to the control center to guide water along the first track for an increased duration at increased time intervals relative to the first level.

The user control portal may be structured to determine a threat based on calculated distance of a hazard from a structure as compared to a third threshold distance, categorize the threat into a third level, and transmit the corresponding threat level and instruction set to the control center to guide water along the first track for an increased duration at increased time intervals relative to the second level.

The user control portal may also be structured to determine a threat based on calculated distance of a hazard from a structure as compared to a fourth threshold distance, categorize the threat into a fourth sublevel, and transmit the corresponding threat level and instruction set to the control center to close the first track valves, open a section of the plurality of valves establishing the second track to guide chemically infused water therethrough for a single continuous predetermined period of time.

The user control portal may be structured to determine a threat based on calculated distance of a hazard from a structure as compared to the fourth threshold distance, determine the initial fourth sublevel action has terminated, categorize the threat into another fourth sublevel, and transmit the corresponding threat level and instruction set to the control center to close the second track valves, open the first track valves, and guide water along the first track for an increased duration at increased time intervals relative to the third level.

Furthermore, the user control portal may be structured to determine a threat based on calculated distance of a hazard from a structure as compared to a fifth threshold distance, categorize the threat into a fifth level, and transmit the corresponding threat level and instruction set to the control center to guide water along the first track for the longest duration of time relative to all other levels.

The control center may include a cellular module structured to send and receive threat level information relative to a structure and initiate an action or inaction based on the threat level information. The cellular module may be operable independently of a structure's internet source.

In some specific embodiments, the user control portal may be structured to calculate and categorize a first level threat by averaging at least three distance points from a known active fire relative to a structure and comparing the average to a five-mile radius from the structure. It may be able to calculate and categorize a second level threat by averaging at least three distance points from a known active fire relative to a structure and comparing the average to a four-mile radius from the structure. Likewise, it may be able to calculate and categorize a third level threat by averaging at least three distance points from a known active fire relative to a structure and comparing the average to a three-mile radius from the structure. A fourth level threat may be calculated and categorized by averaging at least three distance points from a known active fire relative to a structure and comparing the average to a two-mile radius from the structure. A fifth level threat may be calculated and categorized by averaging at least three distance points from a known active fire relative to a structure and comparing the average to a distance equal to or less than a one-mile radius from the structure.

In some embodiments, the plurality of spray nozzles may include at least one of: a first set of spray nozzles fixedly attached to a pitched roof extending through the exterior surface of the pitched roof edge at an angle; a second set of retractable spray nozzles surrounded by spray nozzle housings structured to support and protect the retractable spray nozzles; a third set of retractable spray nozzles positioned on a structure's curtilage; and a fourth set of spray nozzles positioned underneath a structure's eaves.

The control center may include at least one of an antenna, ventilation apertures, ventilation covers, a user interface, a power supply, circuit, protectors, a distribution block, control relays, terminal blocks, at least one motor, and a disconnect switch. The antenna may be structured to receive instruction sets from the user control portal and transmit those instruction sets to a controller for processing by the control center. Furthermore, the control relays may be structured to actuate the at least one motor and the automated valves to guide water through at least one of a first track and a second track depending on instructions received from the instruction sets.

In another embodiment, the automated structure and curtilage protection system may include a mechanical system hub including a control center with at least one antenna, ventilation apertures, ventilation covers, a user interface, a power supply, circuit protectors, a distribution block, control relays, terminal blocks, and at least one motor. It may include a pump, a pressure tank, a plurality of automated valves, and a chemical injector assembly. It may further include a piped network with the plurality of automated valves operable to create a first track structured to autonomously deliver only water to a structure's roof, eaves and curtilage whereby the plurality of automated valves may be structured to create a second track operable to autonomously deliver only chemically infused water solely to the curtilage. This embodiment may include a plurality of spray nozzles and a remote user control portal.

The system may take action depending on a hierarchy of preprogrammed threat levels. One such action may be to autonomously deliver water at set time intervals onto a structure and curtilage when instruction sets corresponding to relative threat levels have been activated. Another such action may be to autonomously deliver chemically infused water solely to the curtilage for a set time interval when instruction sets corresponding to a relative threat level have been activated.

The control center and the remote user control portal may be operable to have a user manually override instruction sets preprogrammed into the automated structure and curtilage protection system. Furthermore, the at least one antenna may be operable to receive instruction sets from the user control portal and transmit those instruction sets to a controller for processing by the control center. The control relays may be operable to actuate the at least one motor and the automated valves to guide water through at least one of the first track and the second track depending on instructions received from the instruction sets. The user control portal may also be structured to calculate and display current hazard threats and their distance from a structure utilizing the location of the structure and known hazard distance relative to the location of the structure.

The user control portal may be structured to calculate a threat level based on the hazard's distance from a structure and communicate the threat level to the structure's control center to initiate preprogrammed action relative to the calculated threat level. Furthermore, the control center may be structured to keep all system valves closed when an initial threat level indicating an absence of threat has been communicated to the control center. It may open a first set of piped network valves within the mechanical system hub to autonomously deliver water to a structure's roof and curtilage when a first through third level, fourth sub level, and fifth level of threat have been communicated to the control center. It may also close the first set of piped network valves and open a second set of piped network valves within the mechanical system hub to autonomously deliver chemically infused water solely to the curtilage when an alternate fourth sub level has been communicated to the control center.

In this embodiment, the system may be operable to direct water within the piped network at a higher psi through the first track and lower psi through the second track.

BRIEF DESCRIPTION OF THE DRAWINGS

FIG. 10 is a top perspective view of a structure and curtilage protection system emphasizing curtilage protection of a pitched roof structure according to an embodiment of the invention.

FIG. 5I is a front view of a control center user interface according to an embodiment of the invention.

FIG. 5J is a front view of a control center user interface according to an embodiment of the invention.

FIG. 5K is a front view of a control center user interface according to an embodiment of the invention.

FIG. 5L is a front view of a control center user interface according to an embodiment of the invention.

FIG. 5Q is a front view of a control center user interface according to an embodiment of the invention.

FIG. 5R is a front view of a control center user interface according to an embodiment of the invention.

FIG. 10 is a table outlining preprogrammed instruction sets and system actions used by the structure and curtilage protection system according to an embodiment of the invention.

FIG. 12B is a view of a system configuration page of a remote user portal used by the structure and curtilage protection system according to an embodiment of the invention.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "top" "bottom" "right" "left" and other like terms are used for the convenience of the reader in reference to the drawings. Additionally, the description may contain terminology to convey position, orientation, and direction without departing from the principles of the present invention. Such positional language should be taken in context with the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1A:
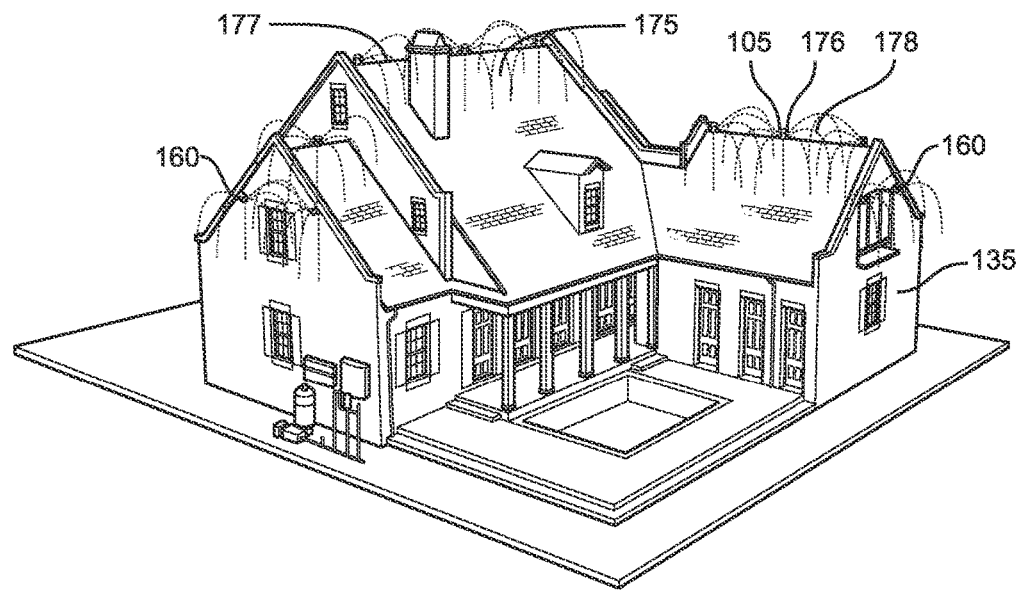
FIG. 1A is a top perspective view of a structure and curtilage protection system according to an embodiment of the invention.
Figure 1B:
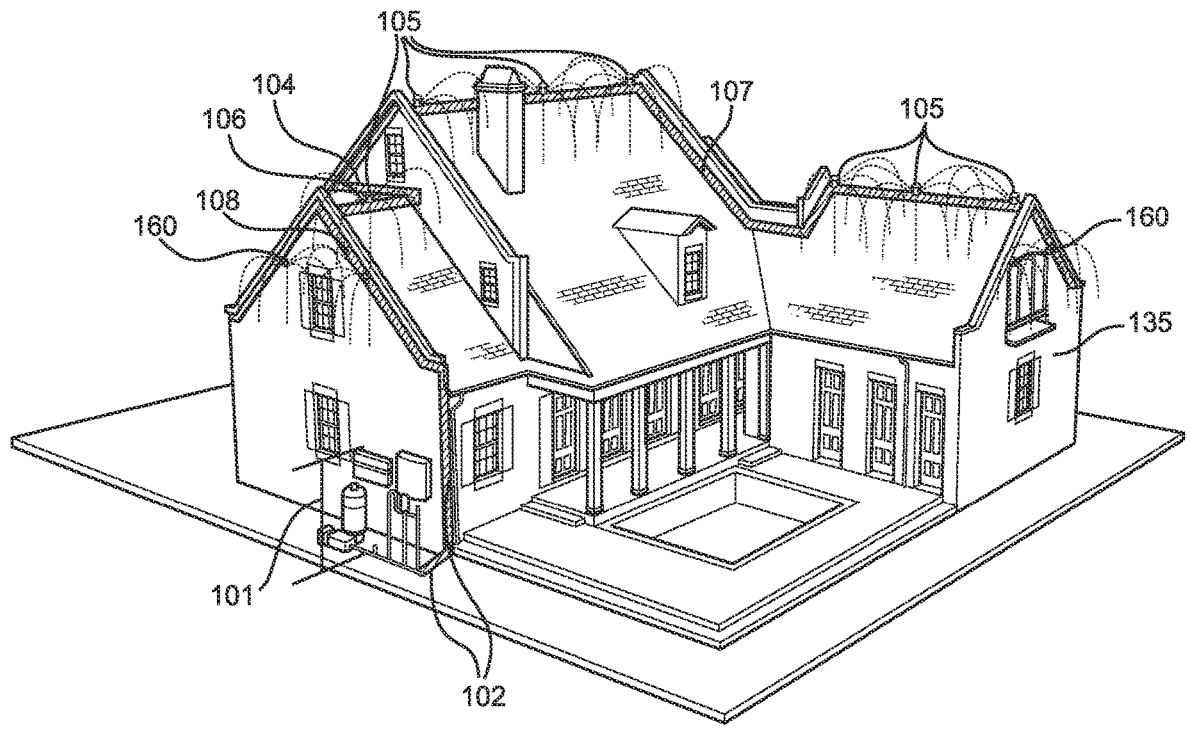
FIG. 1B is a top perspective view a structure and curtilage protection system according to an embodiment of the invention.
Figure 1C:
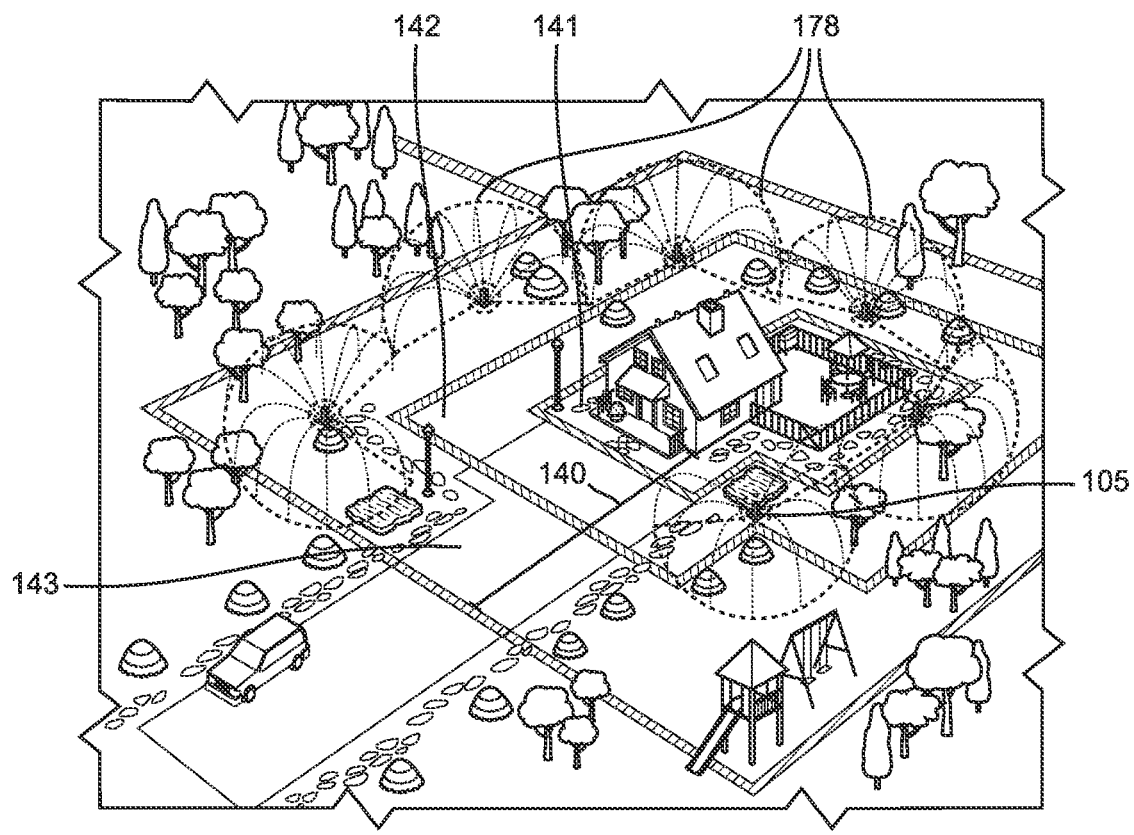
Figure 2A:
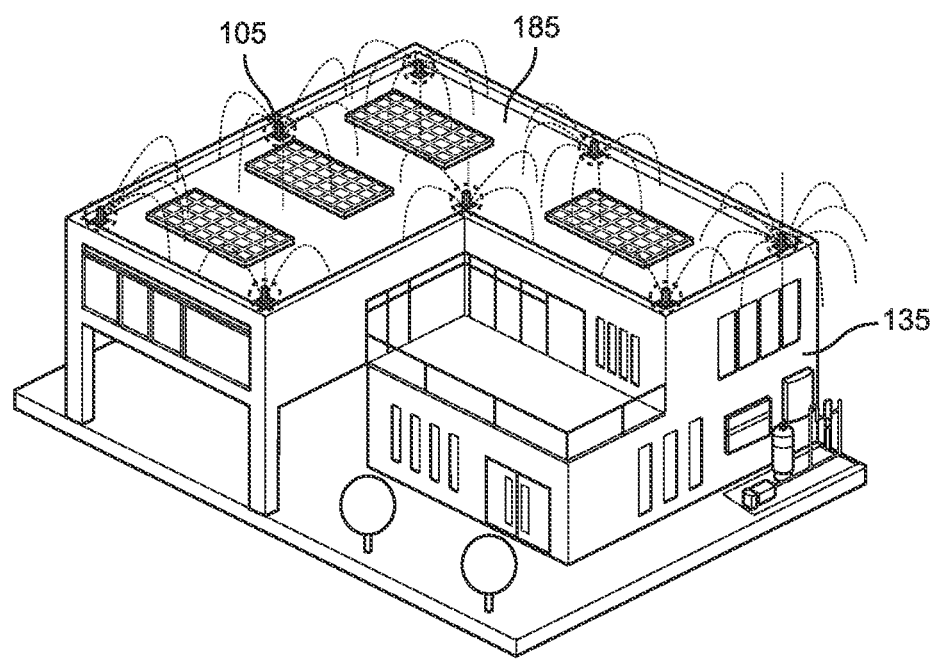
FIG. 2A is a top perspective view a structure and curtilage protection system according to an embodiment of the invention.
Figure 2B:
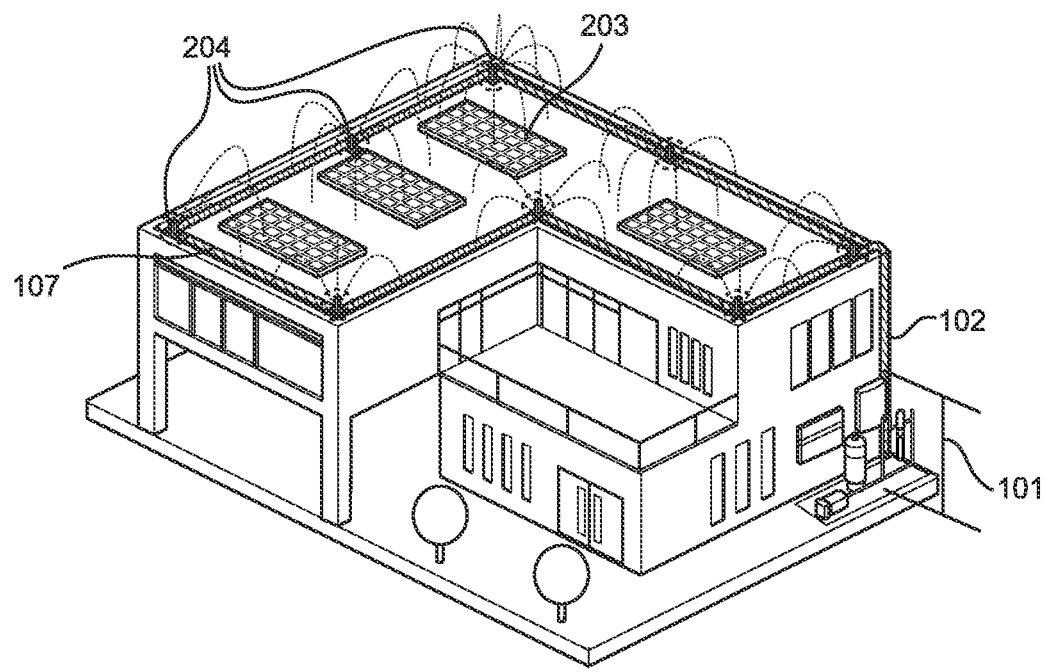
FIG. 2B is a top perspective view a structure and curtilage protection system according to an embodiment of the invention.
Figure 2C:
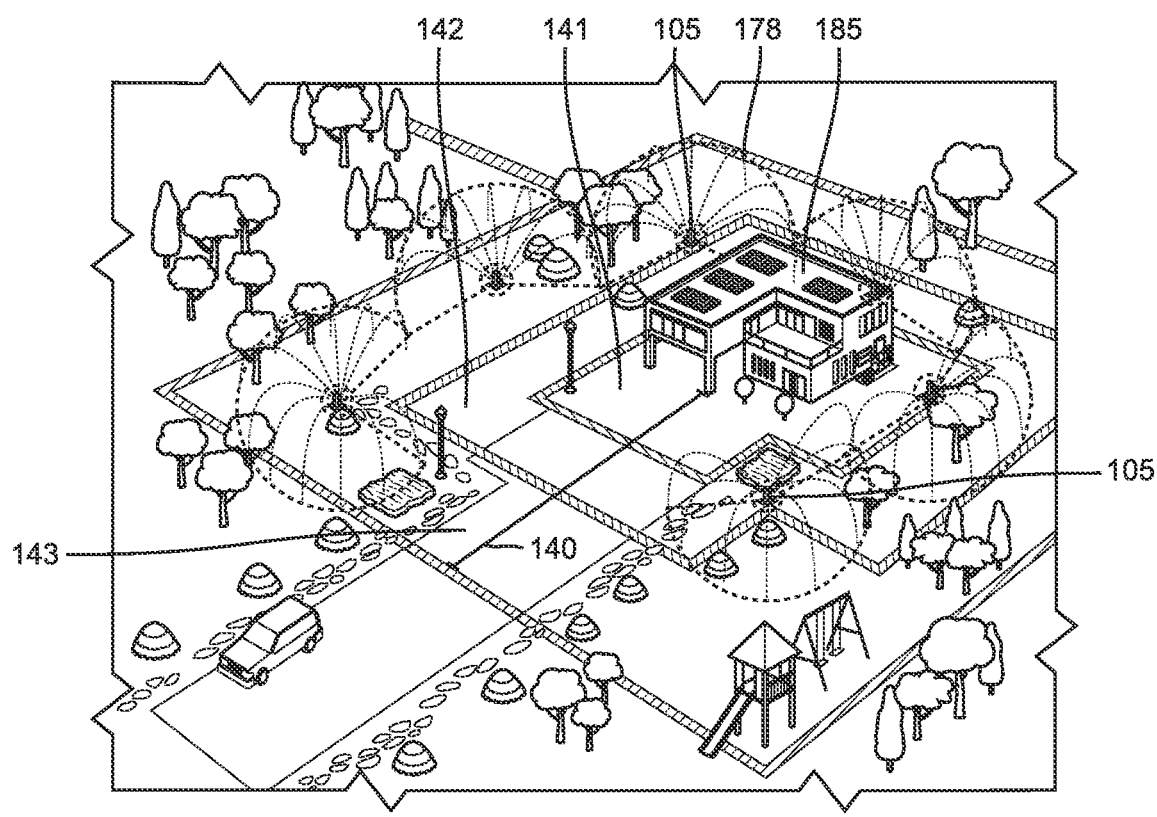
FIG. 2C is a top perspective view of a structure and curtilage protection system emphasizing curtilage protection of a flat roof structure according to an embodiment of the invention.

FIGS. 1A-2C illustrate an automated structure and curtilage protection system 100, hereinafter the system 100, that will be described in more detail throughout the application. FIGS. 1A through 1C illustrate that the system 100 may be integrated into a new or existing structure 135 with a pitched roof 175. FIGS. 2A through 2C illustrate that the system 100 may be integrated into a new or existing structure 135 with a flat roof 185.

Referring specifically to FIG. 1A, a new structure 135 is shown with a pitched roof 175 whereby the system 100 has been integrated into the new structure's 135 construction, for example into the walls and roof. As shown, spray nozzles referred to as pitched roof sprinklers 176 may be positioned along the roof's ridge 177 to disperse liquid onto the pitched roof 175. Also shown are spray nozzles underneath the eaves 160 of a structure 135 to further accomplish the system 100 objectives.

In some embodiments, the spray radius 178 of the pitched roof sprinklers 176 may be at least one of 90-degrees, 180-degrees, and 360-degrees. In other embodiments, the spray radii 178 may be consistent but staggered with different orientations. By way of non-limiting example, the spray radius 178 may be 180-degrees on one pitched roof sprinkler 176 oriented at an angle to cover one side of the pitched roof 175. An adjacent pitched roof sprinkler 176 may also be 180-degrees, but oriented at an angle to cover an opposing side of the pitched roof 175. This staggered orientation may allow for the entire pitched roof 175 to be blanketed with liquid by the pitched roof sprinklers 176. However, one skilled in the art will appreciate that the orientation angle and spray radius 178 of each pitched roof sprinkler 176 may be adjusted depending on need, preference, and circumstance.

FIG. 1B illustrates an existing structure 135 with a pitched roof 175 that has been upgraded with the system 100 post construction. Similar to new structure 135 constructions, FIG. 1B shows that pitched roof sprinklers 176 may be positioned along the roof's ridge 177 at strategically positioned deployment points 105 to disperse liquid onto the pitched roof 175. Likewise, the spray radius 178 of the pitched roof sprinklers 176 may be at least one of 90-degrees, 180-degrees, and 360-degrees. In other embodiments, the spray radii 178 may be consistent but staggered with different orientations. Similarly, one skilled in the art will appreciate that the orientation angle and spray radius 178 of each pitched roof sprinkler 176 may be adjusted depending on need, preference, and circumstance.

Also shown is that the system 100 may include a mechanical system hub 101 proximate a structure and a piped network 107 fixedly attached thereon. The piped network 107 may include vertically oriented piping 102, angled piping 108, and lateral piping 104. In some embodiments, the piped network 107 may be disguised with faux gutter housing 102 along a structure's walls and top hat pipe covering along a structure's roof constructed to match the structure's 135 aesthetic features and conceal the piped network 107 therein. In some embodiments, the faux gutter housing 102 may be a non-functional façade. However, in other embodiments, the faux gutter housing 102 may act as a functional gutter system for the structure 135.

FIG. 1C illustrates an embodiment of the system 100 with pitched roof 175 as it may be organized to protect the curtilage 140 of a structure 135. For purposes of this application, curtilage 140 shall be defined as a structure's 135 surrounding land including its vegetation, landscaping and paving. In some embodiments, the curtilage 140 may be divided into zones. By way of non-limiting example, a first zone 141 may be between the structure 135 and within 5-feet therefrom. A second zone 142 may be between the end of the first zone 141 and within 30-feet therefrom. A third zone 143 may be between the end of the second zone 142 and within 100-feet therefrom. Dividing the curtilage into zones may assist with how and where to position the deployment points 105 and how to configure the spray radius 178 of each deployment point 105. It may also assist with system 100 actions needed to be taken relative to hazard proximity. All embodiments may include either the retractable spray nozzles, the pitched roof sprinklers 176, or any other liquid dispersing means positioned in the curtilage 140.

FIGS. 2A and 2B illustrate an integrated new structure 135 and an upgraded existing structure 135 respectively. However, these embodiments of the system 100 may be utilized on structures 135 with flat rooves 185.

Similar to the construction of the pitched roof 175 system 100, a flat roof 185 construction may include strategically positioned deployment points 105 with spray radii 178 of up to 360-degrees on the flat roof 185. Also shown are system solar panels 203, which may integrate into the system 100 as an alternate power source capable of being used with a pitched roof 175 and flat roof 185 configuration.

A flat roof 185 system 100 may also include a mechanical system hub 101 and piped network 107 with vertically oriented piping 102, angled piping 108, and lateral piping 104. It may include embodiments with the piped network 107 disguised by faux gutter housing 102 along a structure's walls and top hat pipe covering along a structure's roof constructed to match the structure's 135 aesthetic features and conceal the piped network 107 therein. Similarly, the faux gutter housing 102 may be a non-functional façade or may act as a functional gutter system for the structure 135.

The difference between a pitched roof 175 embodiment and a flat roof embodiment 185, as will be described in more detail hereinafter, is that a flat roof 185 configuration may include spray nozzles referred to as retractable spray nozzles positioned within nozzle housings 204 atop the flat roof 185. The nozzle housings 204 may be made of rigid material such as metal, plastic, or wood and may be structured to blend with the aesthetic features of the structure 135 and stabilize the retractable spray nozzles.

FIG. 2C illustrates an embodiment of the system 100 on a flat roof 185 as it may be organized to protect the curtilage 140 of a structure 135. Similar to the system 100 on a pitched roof 175, in some embodiments the curtilage 140 may be divided into zones. By way of non-limiting example, a first zone 141 may be between the structure 135 and within 5-feet therefrom. A second zone 142 may be between the end of the first zone 141 and within 30-feet therefrom. A third zone 143 may be between the end of the second zone 142 and within 100-feet therefrom. As previously mentioned, dividing the curtilage into zones may assist with how and where to position the deployment points 105 and how to configure the spray radius 178 of each deployment point 105. It may also assist with actions needed to be taken relative to hazard proximity.

Figure 3A:
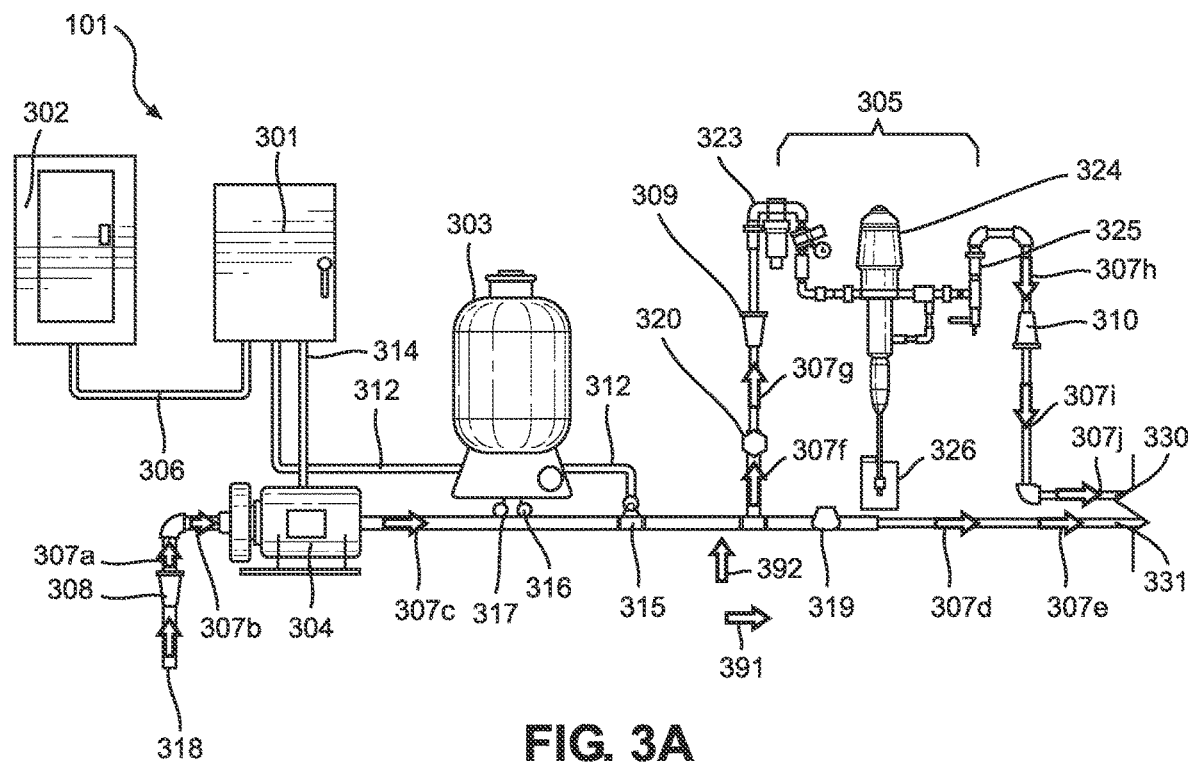
FIG. 3A is a sectional view of the mechanical system hub of a structure and curtilage protection system according to an embodiment of the invention.

FIG. 3A illustrates the mechanical system hub 101 proximate a structure 135 within the system 100. Each structure 135 participating in the system 100 may include its own local mechanical system hub 101. The mechanical system hub 101 may include a control center 301, a pressure tank 303, a pump 304, a plurality of check valves 308, 309, 310, a plurality of controllable valves 319, 320, a chemical injector assembly 305, and two potential tracks within the piped network 107 for waterflow consisting of a first track 391 and a second track 392.

The control center 301 may act as a local control for the electrical, mechanical, and programmatic functionality for physical action and inaction of the system 100 as it pertains to a particular structure 135. As will be described more fully hereafter, the control center 301 may receive its instructions either remotely from a user control portal or manually from a local interface.

The pressure tank 303 may work in conjunction with the pump 304 to maintain, increase, and decrease water pressure within the system 100. The pressure tank 303 may create water pressure by using compressed air to bear down on the water. When a valve in the pressure tank 303 is opened, water may be pushed out by the compressed air in the pressure tank 303 and pumped throughout the system 100 until the pressure drops to a preset low.

The pump 304 may be a variable speed pump operable to maintain, increase and decrease water pressure throughout the system 100 depending on preprogrammed threat levels. By way of non-limiting example, the pump 304 may be a 3-phase pump with the ability to vary its speed to keep the system 100 at an intended pressure. As will be described more fully, in some embodiments the system 100 with assistance from the pump 304 may maintain a constant psi of 65 when waterflow takes the first track 391 and may decrease to 55 psi when waterflow takes the second track 392. However, one skilled in the art will appreciate that psi in the system 100 may be more or less depending on the settings, need, and circumstance.

The plurality of valves 308, 309, 310, 319, 320 within the system 100 may be automated either on their own as with the check valves 308, 309, 310 or may be controllable by means of programmatic functionality as intended by the system 100. The check valves 308, 309, 310 may be one-way valves whereby waterflow can run freely one way. However, should the waterflow reverse, the check valves 308, 309, 310 may close to protect the system 100.

The controllable valves 319, 320 may be actuator valves operable by the control center 301 to open and close thereby directing waterflow accordingly. Opening and closing the controllable valves 319, 320 may be done at the direction of preprogrammed settings within the system 100. In one embodiment, controllable valve 320 may remain closed and controllable valve 319 may remain open allowing waterflow to take the direction along the first track 391. Furthermore, controllable valve 320 may be directed open by the system 100 and controllable valve 319 may be closed by the system 100 allowing waterflow to take the second track 392 when preprogrammed instruction sets are activated.

The chemical injector assembly 305 may infuse chemicals into the waterflow that have been directed along the second track 392. These chemicals may be fire retardant chemicals designed to impede the movement of fire and may be used by the second track 392 to establish a protective perimeter on and around the curtilage 140.

The chemical injector assembly 305 may include a filter and pressure regulator 323, an injector 324, inlet and outlet ball valves 325, and a chemical reservoir 326. The injector 324 may physically infuse directed waterflow 307f, 307g with fire retardant chemicals held in the chemical reservoir 326. Furthermore, the inlet and outlet ball valves 325 may insure the waterflow 307f, 307g is traveling in the intended direction. The chemical injector assembly 305 may signify the initial stage of the second track 392 when the system 100 has directed waterflow accordingly.

Following the waterflow pathway into the system 100, the water may enter the mechanical system hub 101 from a water source 318. By way of non-limiting example, the water source 318 may be a well or a municipal source of water. The waterflow 307a may pass through an initial check valve 308 and continue through the pump 304. After the pump 304, the waterflow 307c may pass through an initial pressure gauge 317 associated with the pressure tank 303 to determine initial water pressure. A pressure relief valve 316 associated with the pressure tank 303 may assist with decreasing initial water pressure. Additionally, a pressure transducer 315 may monitor the water pressure and its rate of change. The pump 304, which may be a pressure-controlled variable frequency drive pump (VFD) in conjunction with the control center 301 may interpret the pressure inputs and may output necessary increases or decreases in pump output pressure and flow rate.

The control center 301 may be in communication with the pressure transducer 315 via transducer communication cable 312 and may be in communication with the pump 304 via pump communication cable 314. The control center 301 may monitor pressure within the system 100 and may actuate pump motors based on the data it receives from the pressure transducer 315.

Continuing through the mechanical system hub 101, the waterflow may be directed along at least one of two pathways. The waterflow may take a first track 391 or it may take a second track 392. As will be described in more detail hereafter, all system valves may remain closed when an initial threat level indicating an absence of threat has been communicated to the control center 301. The first track 391 may open controllable valve 319 within the piped network 107 to autonomously deliver water to a structure's roof 175, 185, eaves 160 and curtilage 140 when corresponding instruction sets are realized and activated by the control center 301. The initial stages of the first track 391 are represented by waterflow indicators 307d, 307e, and 331.

Similarly, when instruction sets are realized and activated relative to the second track 392, controllable valve 319 within the piped network 107 may be closed and controllable valve 320 may be opened to autonomously deliver chemically infused water solely to the curtilage 140. The initial stages of the second track 392 are represented by waterflow indicators 307f, 307g, 307h, 307i, 307j, and 330.

A breaker panel 302 of a structure 135 may be in electrical communication 306 with the system 100. In some embodiments, the breaker panel 302 may provide power needed to drive the mechanical system hub 101 as well as provide an added layer of circuitry protection.

Figure 3B:
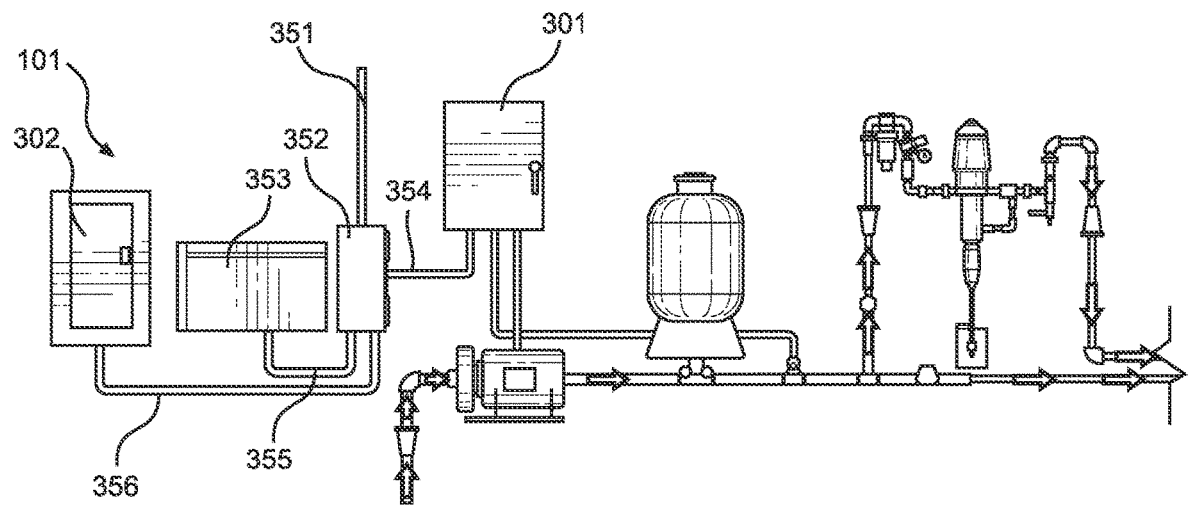
FIG. 3B is a sectional view of the mechanical system hub of a structure and curtilage protection system according to an embodiment of the invention.

FIG. 3B illustrates an embodiment of the system 100 whereby the mechanical system hub 101 further includes a solar storage battery 353 and smart switch 352. The solar storage battery 353 may receive solar energy from the system solar panels 203 and may be in electrical communication 354, 355, 356 with the breaker panel and control center 301 to act as a backup power source should a structure's 135 power be terminated. Furthermore, the smart switch 352 may be a microgrid interconnect device (MID) to enable safe connectivity to a power grid. The smart switch 352 may automatically detect power grid outages to assist with providing seamless transition to the solar storage battery 353 for use as an alternative power source for the system 100.

Figure 3C:
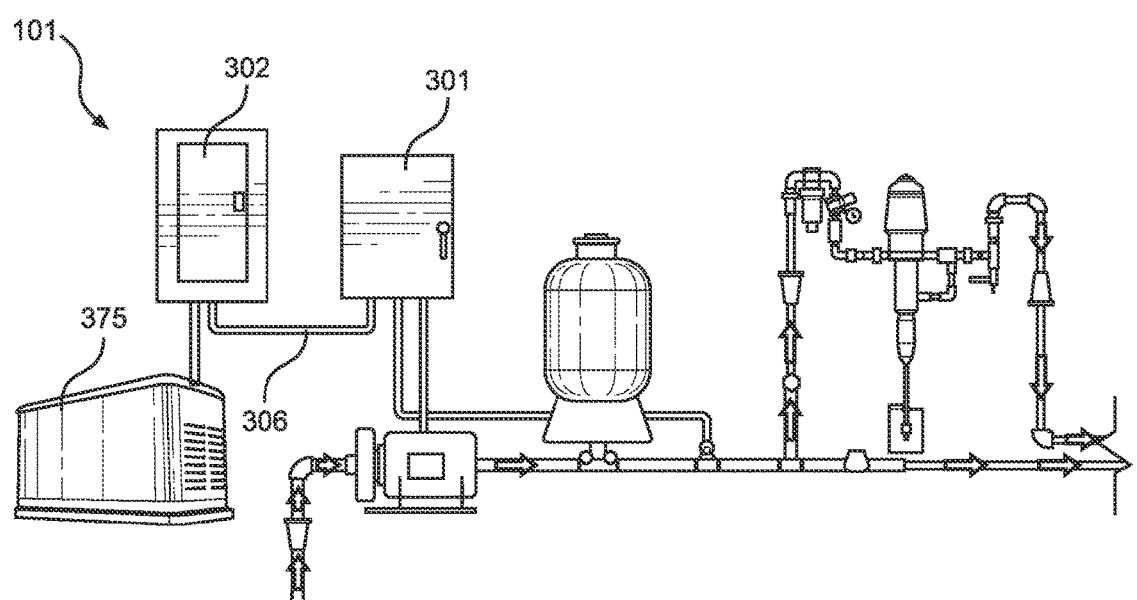
FIG. 3C is a sectional view of the mechanical system hub of a structure and curtilage protection system according to an embodiment of the invention.

FIG. 3C shows an embodiment of the system 100 whereby the mechanical system hub 101 includes a backup generator 375. In some embodiments, the generator 375 may be fueled by propane or gasoline and may include a transfer switch therein to assist with using the generator 375 as an alternative power source for the system 100 during power grid outages.

Figure 4A:
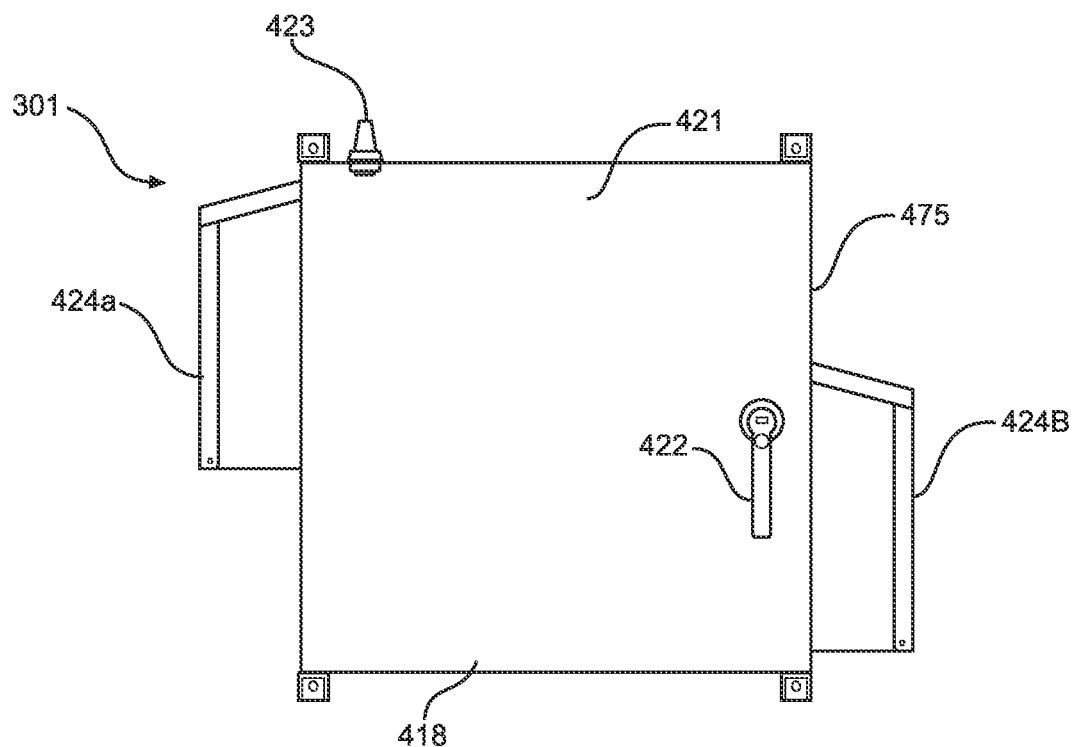
FIG. 4A is a front view of the exterior of a control center of a structure and curtilage protection system in a closed position according to an embodiment of the invention.
Figure 4B:
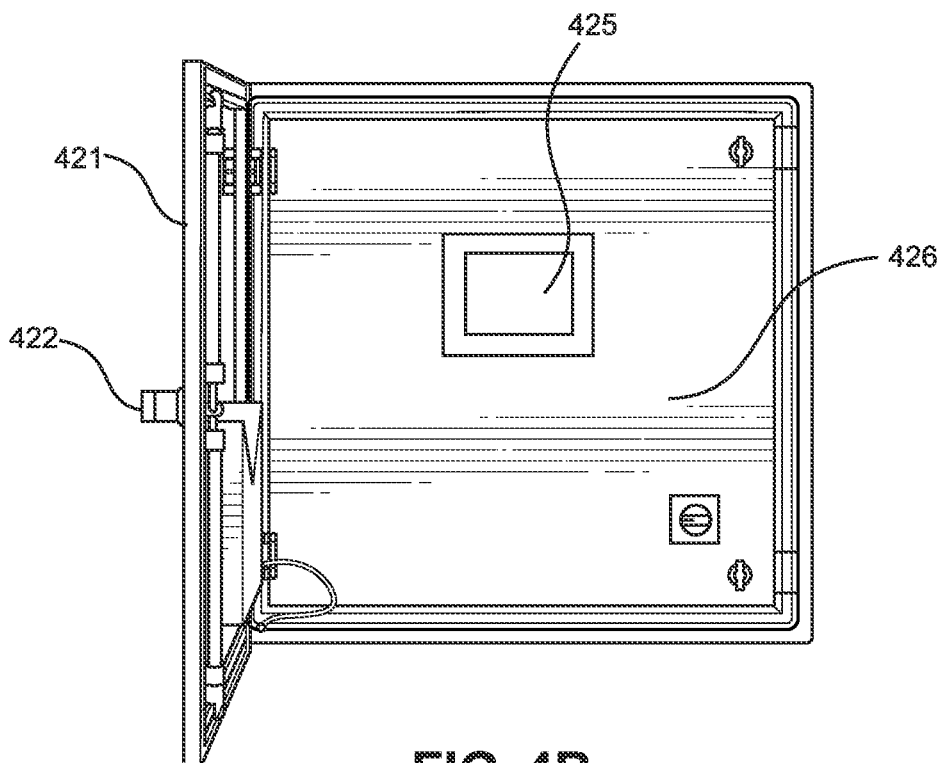
FIG. 4B is a front view of the exterior of a control center of a structure and curtilage protection system in an open position according to an embodiment of the invention.

FIGS. 4A-4F illustrate the mechanical structure and related functional aspects of the control center 301 in more detail. Referring specifically to FIG. 4A and FIG. 4B, the control center 301 may be a metal or plastic enclosure structured to resist corrosion from weathering such as wind, rain and snow. The outside front 421 of the control center 301 may be an enclosure resembling a door with a handle 422 structured to latch to an interior panel 426. In some embodiments the handle 422 may include a lock. The exterior of the control center 301 may be a housing 475 structured to hold and protect its inner componentry.

The housing 475 may include an antenna 423 structured to receive instruction sets from a user control portal and transmit those instruction sets to an internal controller for control center 301 processing and action. The housing 475 may also include housing apertures structured for ventilation that may be protected from the elements by ventilation shrouds 424a, 424b. A user interface 425 may be positioned on the interior panel 426 that may be accessible once the outside front 421 has been opened.

FIGS. 4C-4F illustrate different embodiments of some of the internal componentry of the control center 301 that may be housed on the backside of the interior panel 426 and within a cavity formed between the interior panel 426 and the housing 475.

Figure 4C:
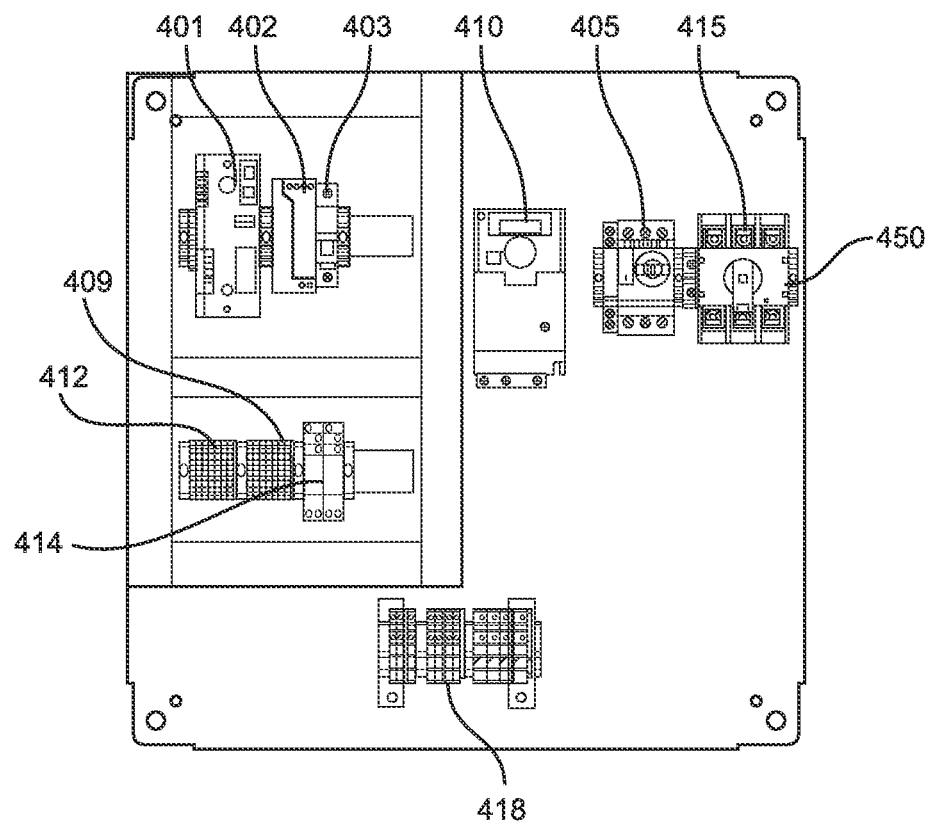
FIG. 4C is an interior view of the control center components according to an embodiment of the invention.

FIG. 4C shows a control panel 301 including a cellular module 401 that may be structured to send and receive threat level information relative to a structure 135 and transmit instruction sets for control panel 301 processing needed to initiate a system 100 action or inaction based on the threat level information. The cellular module 401 may be structured to operate independently of a structure's 135 internet source in the case of power outage. The control panel 301 may also include a power supply 402 that may convert AC power to DC power to feed the control circuitry. Also included may be a motor control circuit protector 405 and a cellular module circuit protector 403 structured to safeguard their respective downstream loads. A motor control 410 structured as a variable frequency drive (VFD) may control the speed of the pump 304 and may be structured to drive an electric motor by varying the frequency and voltage supplied thereto. A disconnect switch 415 may be structured to power on and off the control center 301. Distribution blocks 409, 412 may economically distribute control circuitry and a group of control relays 414 may actuate the controllable valves 319, 320. Terminal blocks 418 may serve as the wiring controls for the motors, controllable valves 319, 320 and the transducer 315.

Figure 4D:
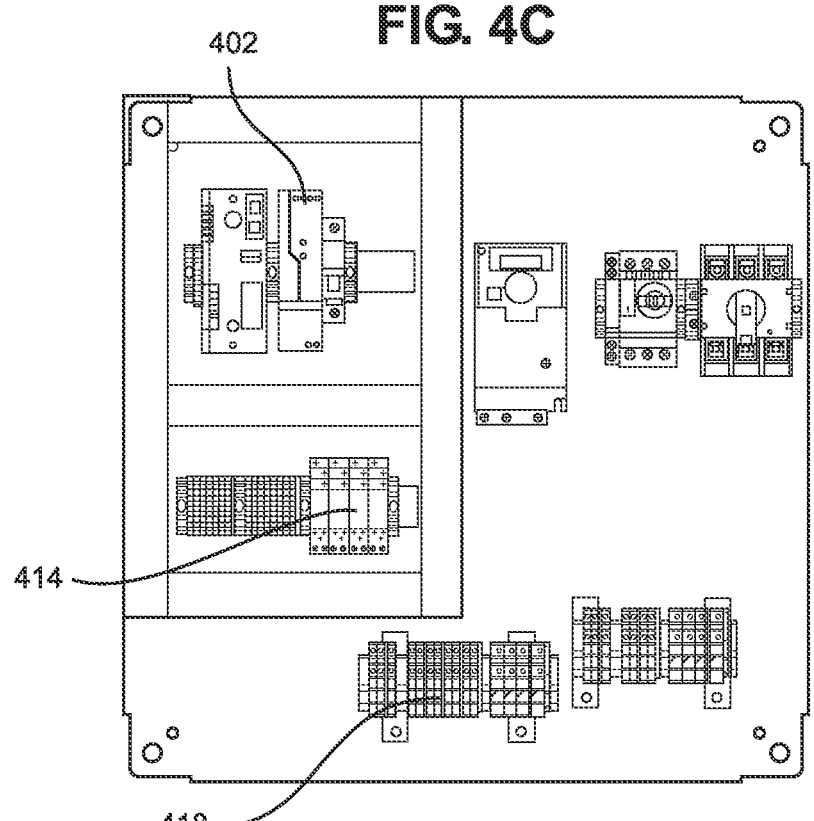
FIG. 4D is an interior view of the control center components according to an embodiment of the invention.

FIG. 4D illustrates that in some embodiments the power supply 402 may be enlarged and the number of control relays 414 and terminal blocks 418 increased to accommodate an increase in motors and controllable valves 319, 320. An increase in controllable valves 319 and motors may occur should a structure 135 utilize a plurality of perimeter defense zones such as those shown in FIGS. 1C and 2C.

Figure 4E:
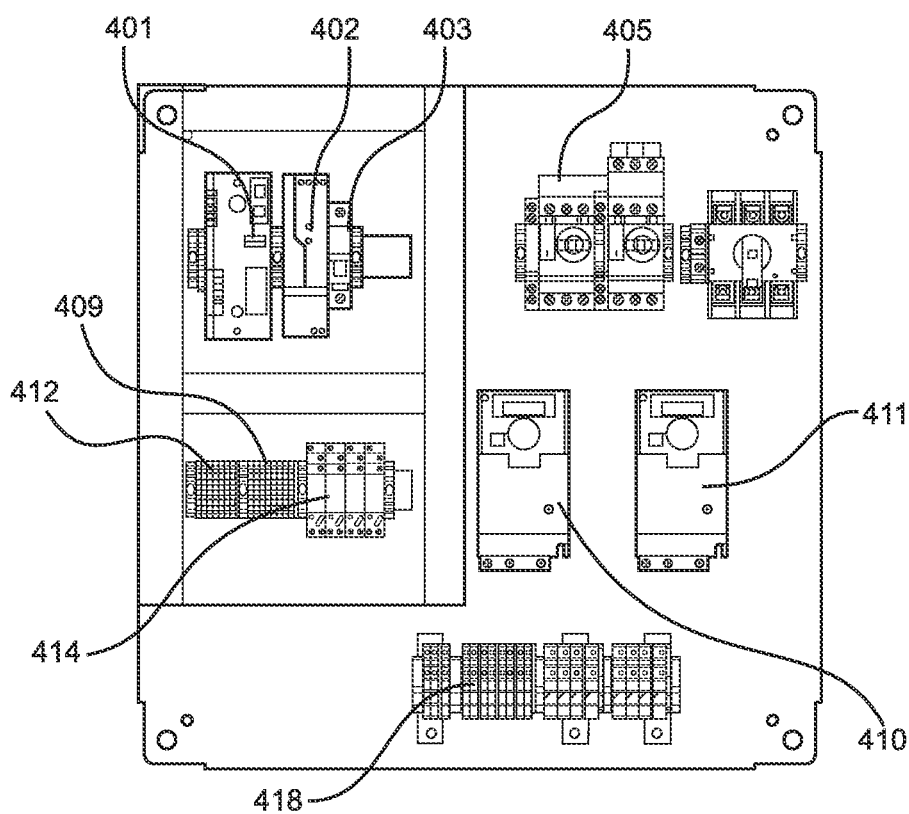
FIG. 4E is an interior view of the control center components according to an embodiment of the invention.
Figure 4F:
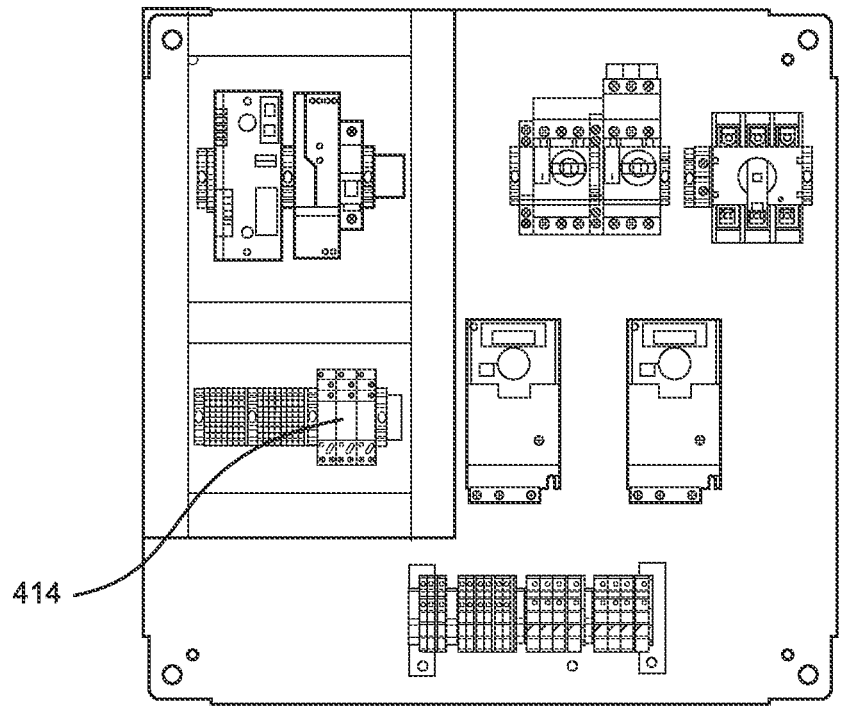
FIG. 4F an interior view of the control center components according to an embodiment of the invention.

FIGS. 4E and 4F show that in some embodiments the number of motor controls 410, 411 may be increased to accommodate a structure utilizing a plurality of pumps 304. Likewise, the size of the power supply 402, the number of control relays 414 and the number of terminal blocks 418 may be increased to accommodate an increase in motors and controllable valves 319, 320. Similar to FIG. 4D, this may occur should a structure 135 need or require additional protection.

Figure 5A:
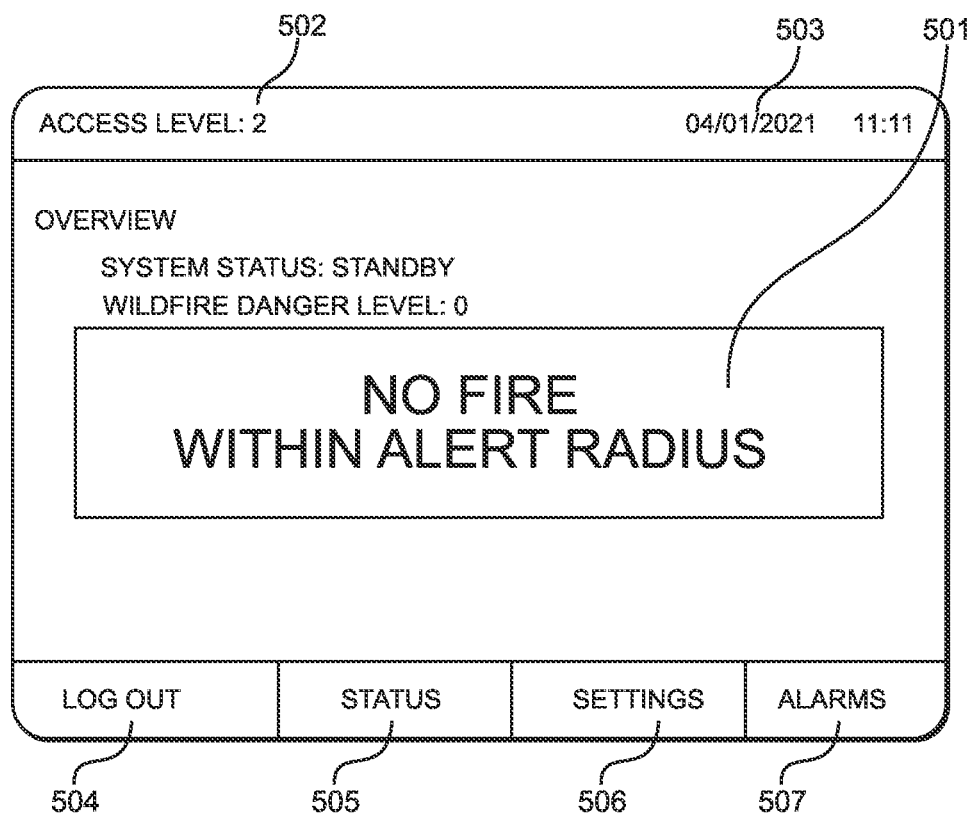
FIG. 5A is a front view of a control center user interface according to an embodiment of the invention.
Figure 5B:
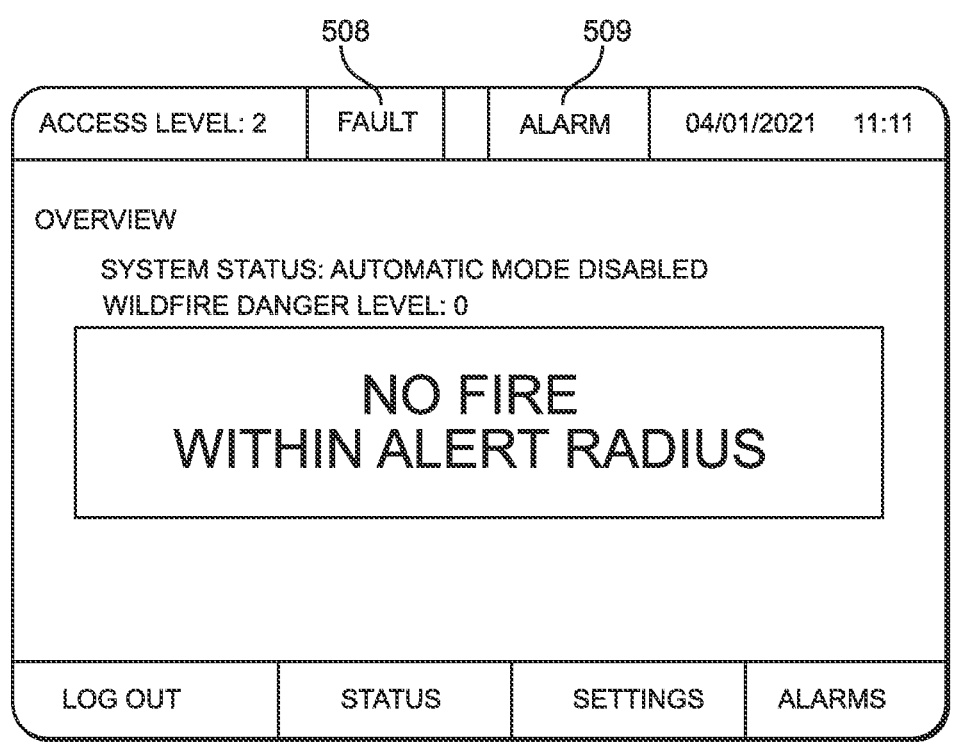
FIG. 5B is a front view of a control center user interface according to an embodiment of the invention.
Figure 5C:
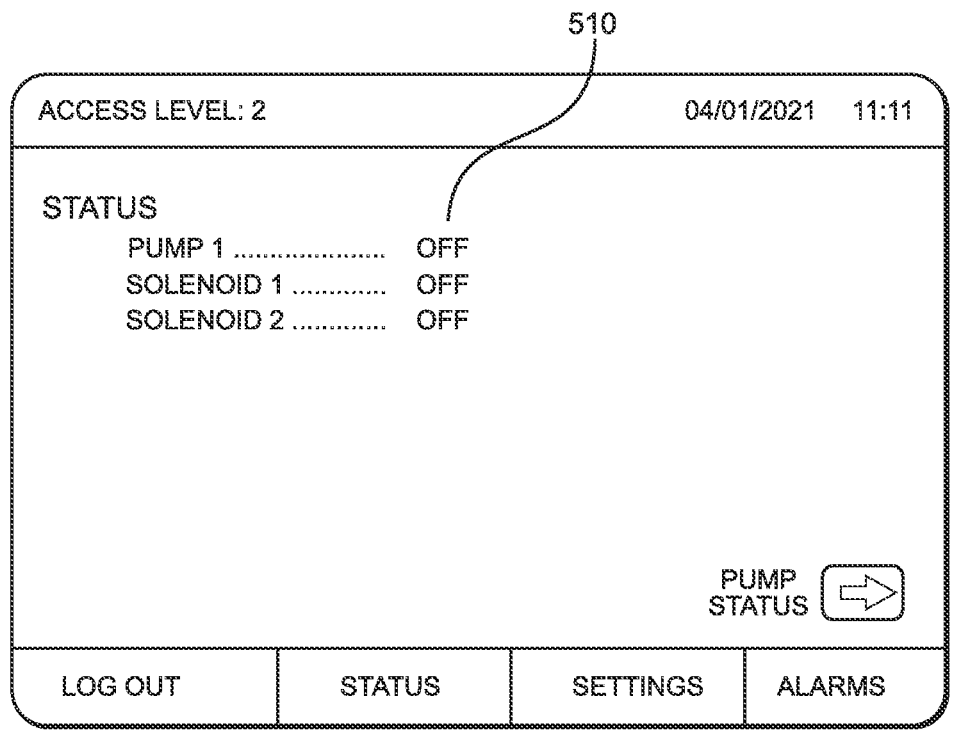
FIG. 5C is a front view of a control center user interface according to an embodiment of the invention.
Figure 5D:
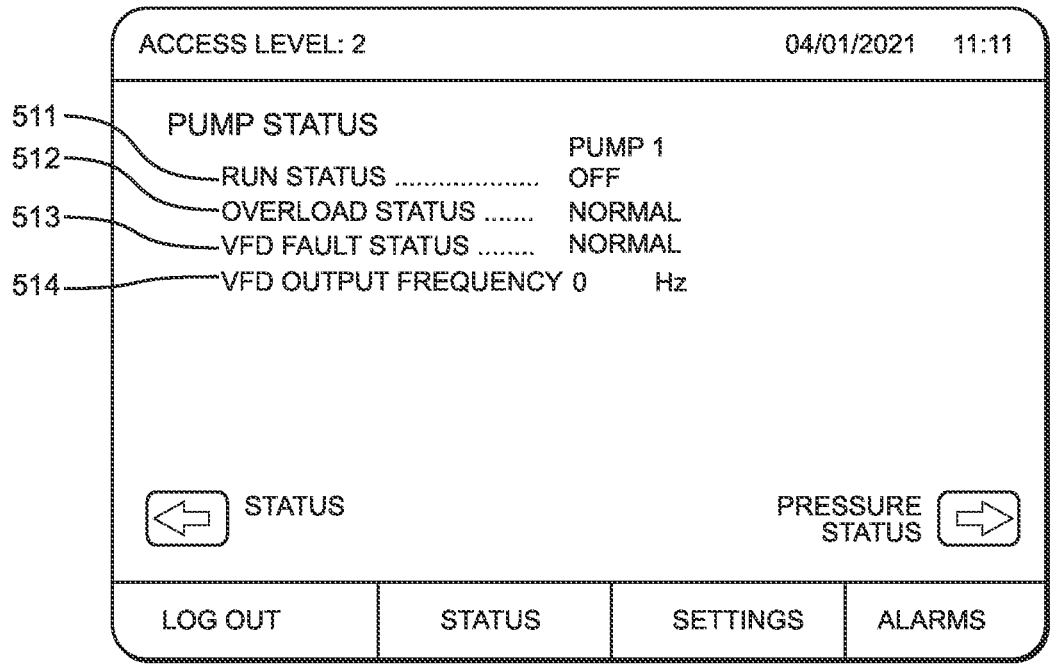
FIG. 5D is a front view of a control center user interface according to an embodiment of the invention.
Figure 5E:
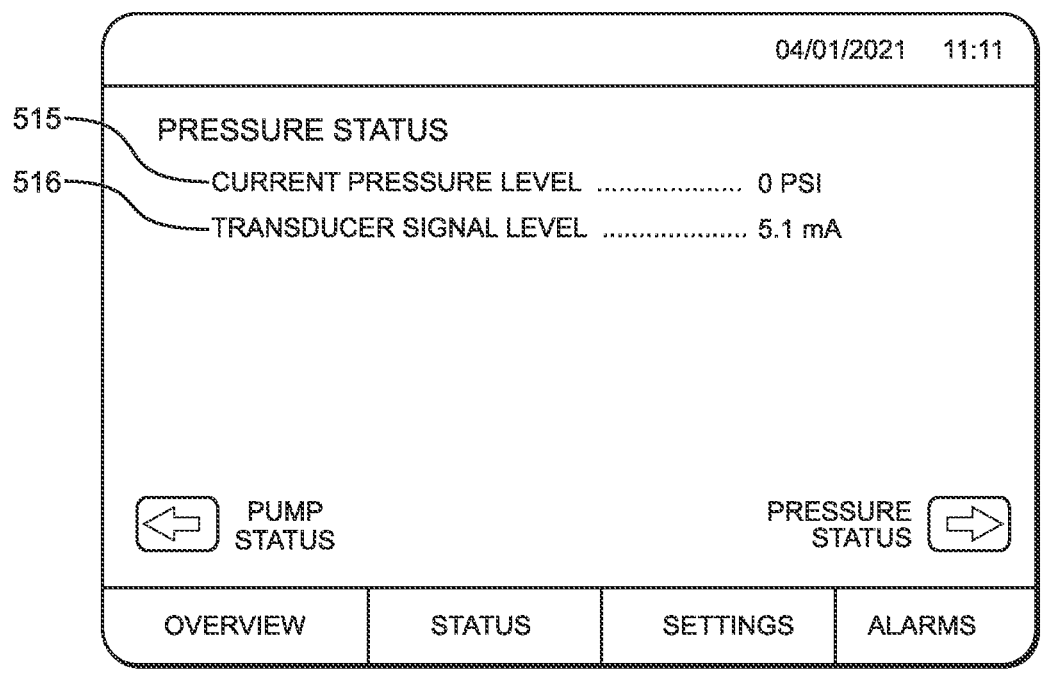
FIG. 5E is a front view of a control center user interface according to an embodiment of the invention.
Figure 5F:
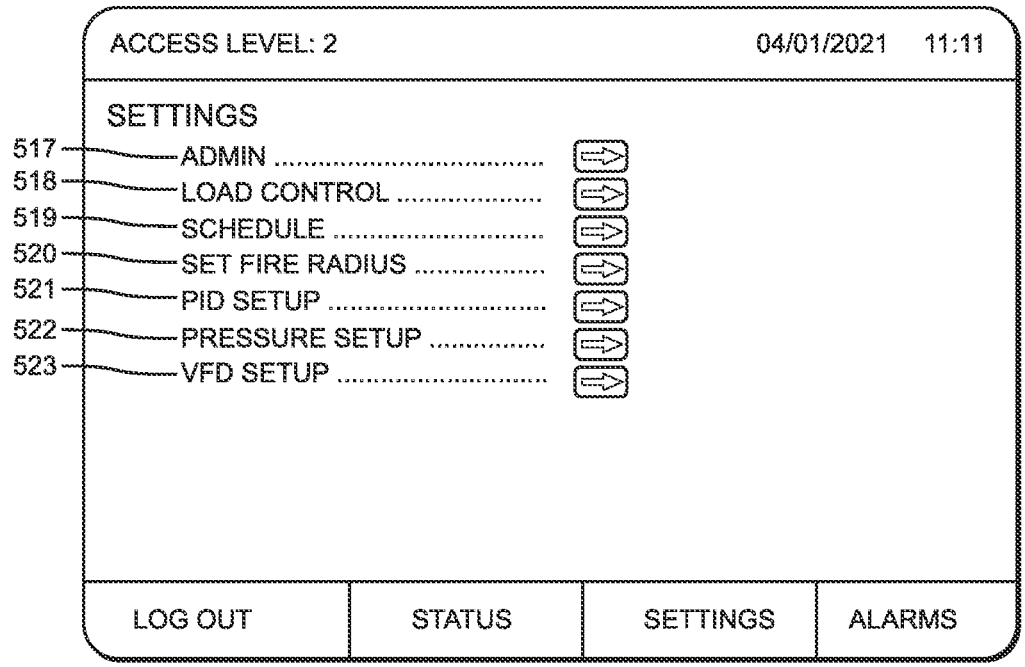
FIG. 5F is a front view of a control center user interface according to an embodiment of the invention.
Figure 5G:
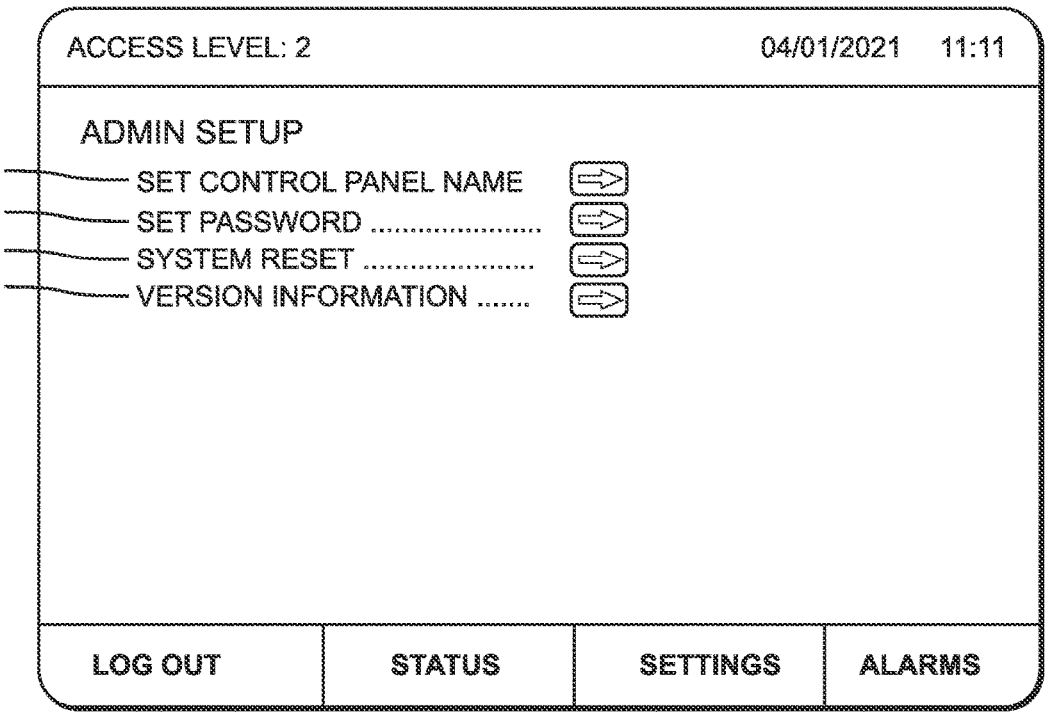
FIG. 5G is a front view of a control center user interface according to an embodiment of the invention.
Figure 5H:
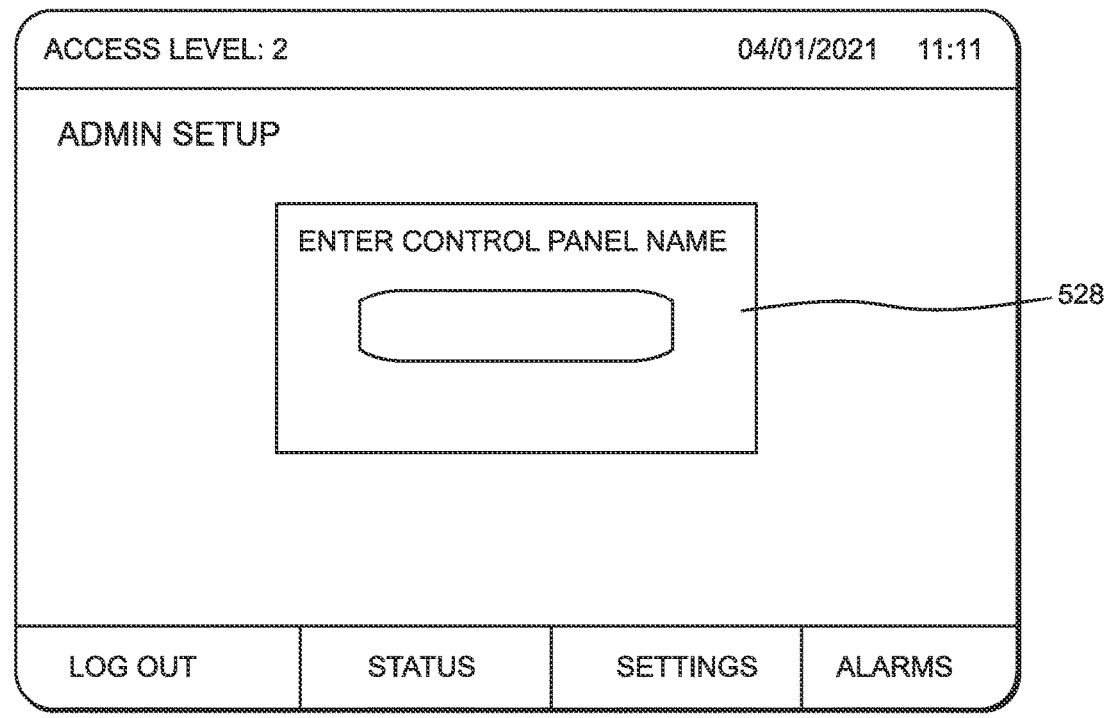
FIG. 5H is a front view of a control center user interface according to an embodiment of the invention.
Figures 5K, 5L:
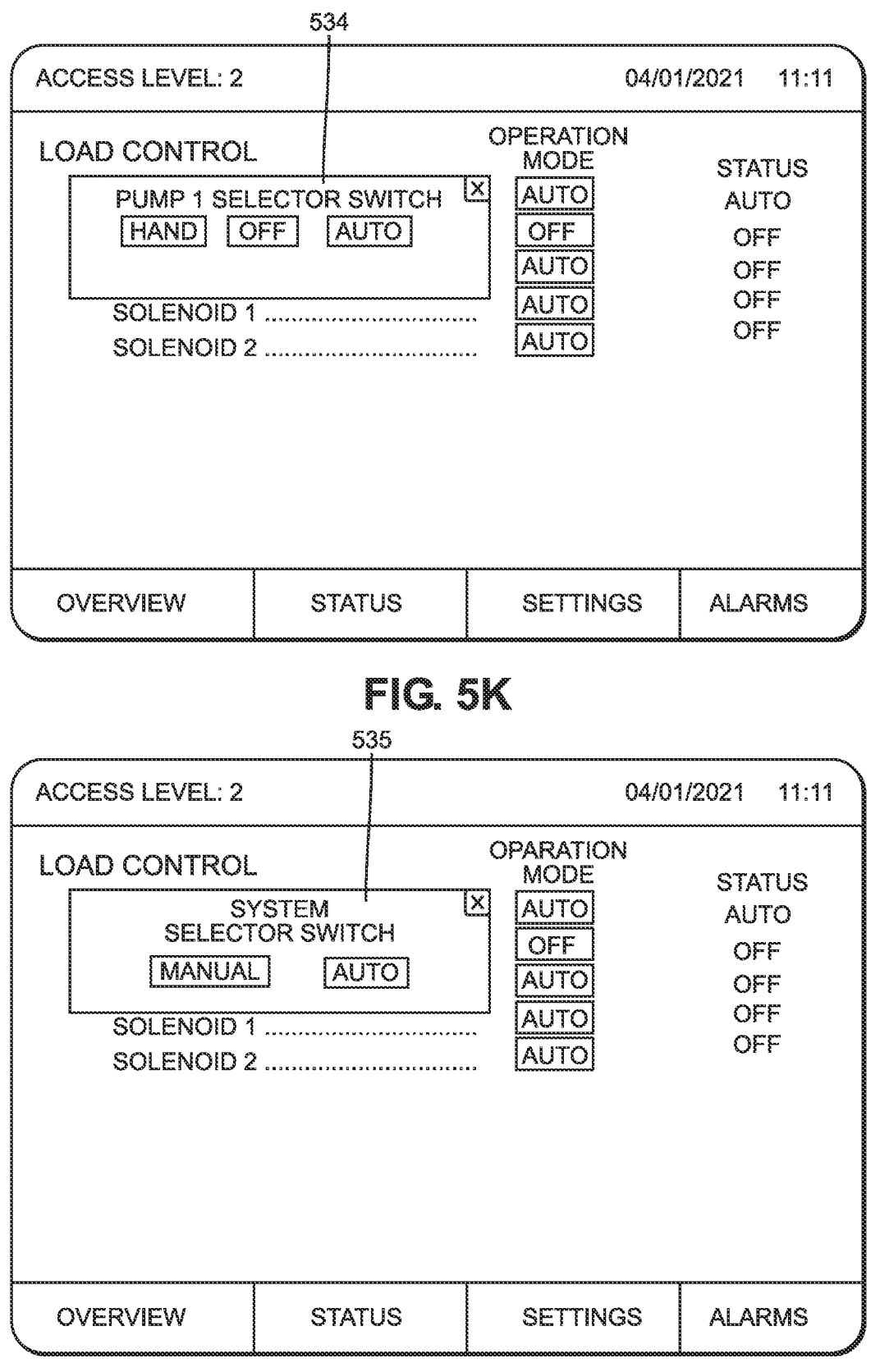
Figure 5M:
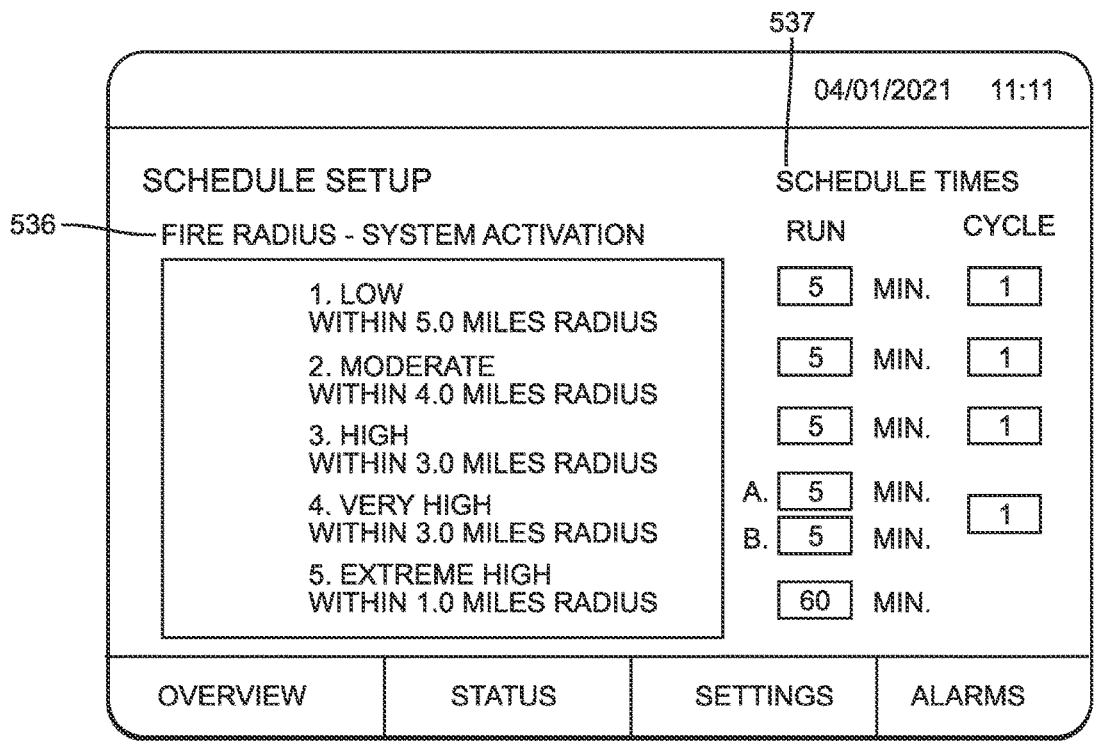
FIG. 5M is a front view of a control center user interface according to an embodiment of the invention.
Figure 5N:
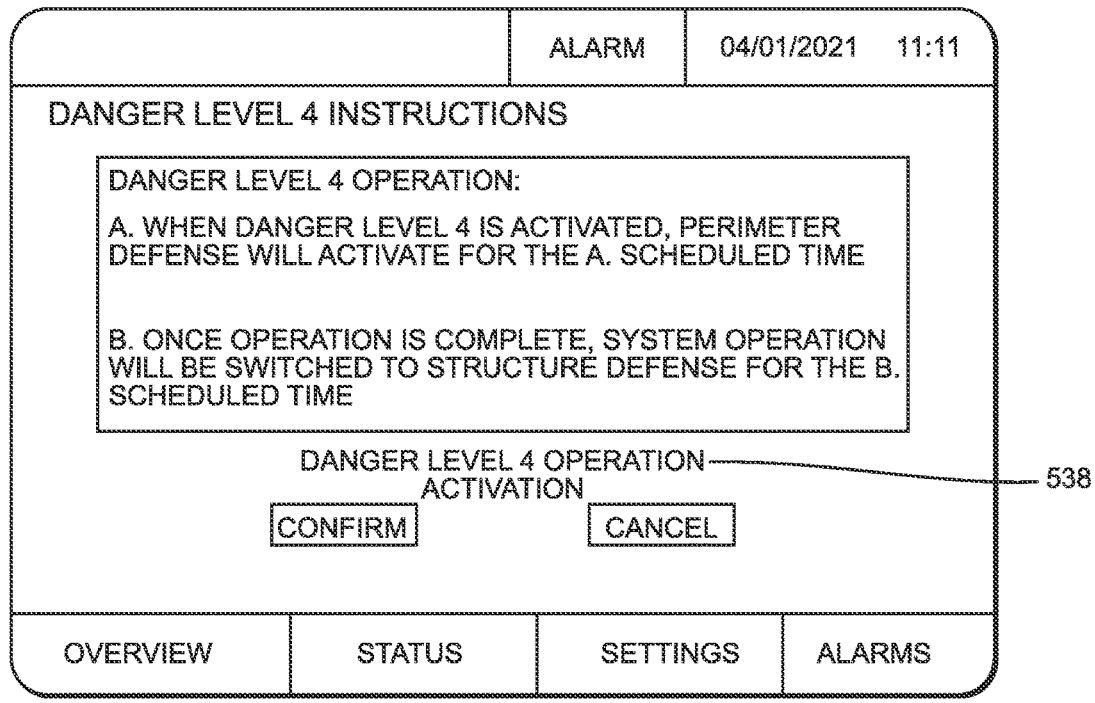
FIG. 5N is a front view of a control center user interface according to an embodiment of the invention.
Figure 5O:
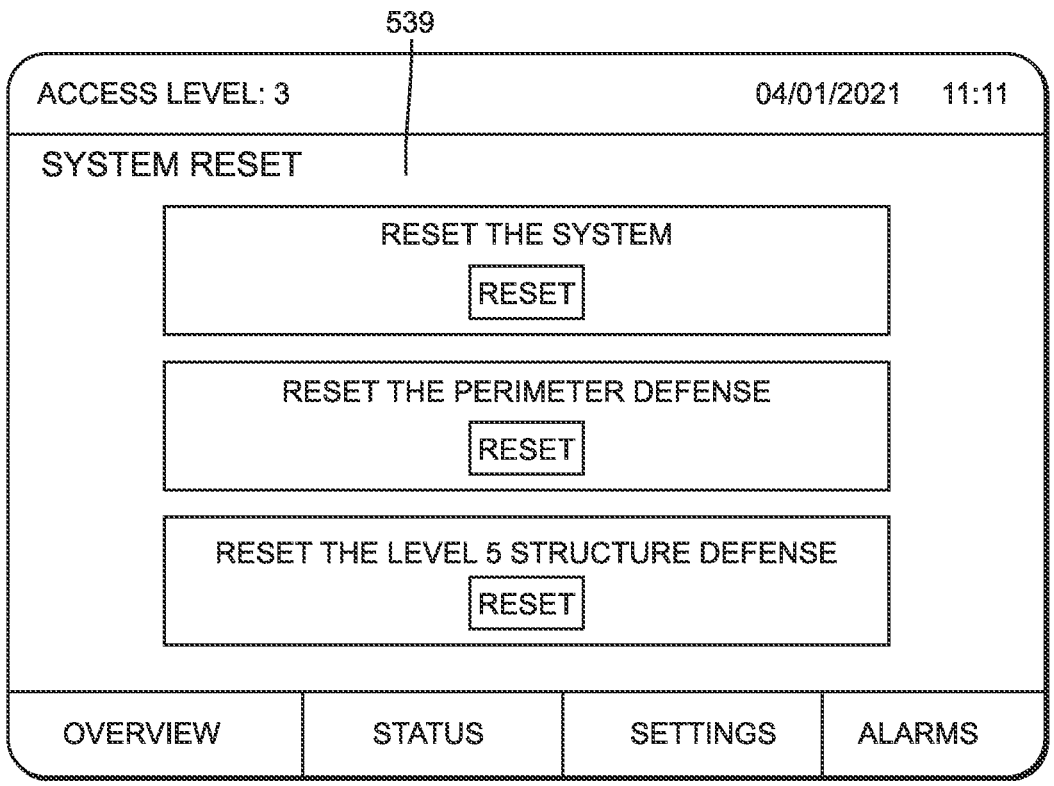
FIG. 5O is a front view of a control center user interface according to an embodiment of the invention.
Figure 5P:
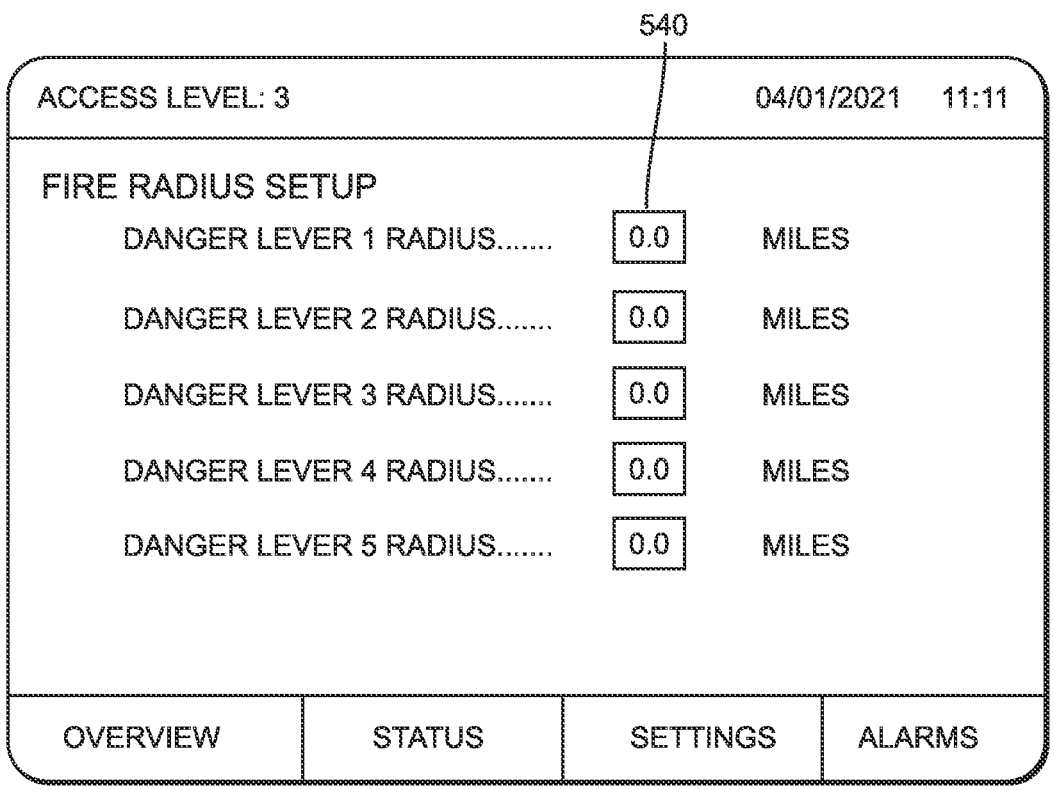
FIG. 5P is a front view of a control center user interface according to an embodiment of the invention.
Figure 5S:
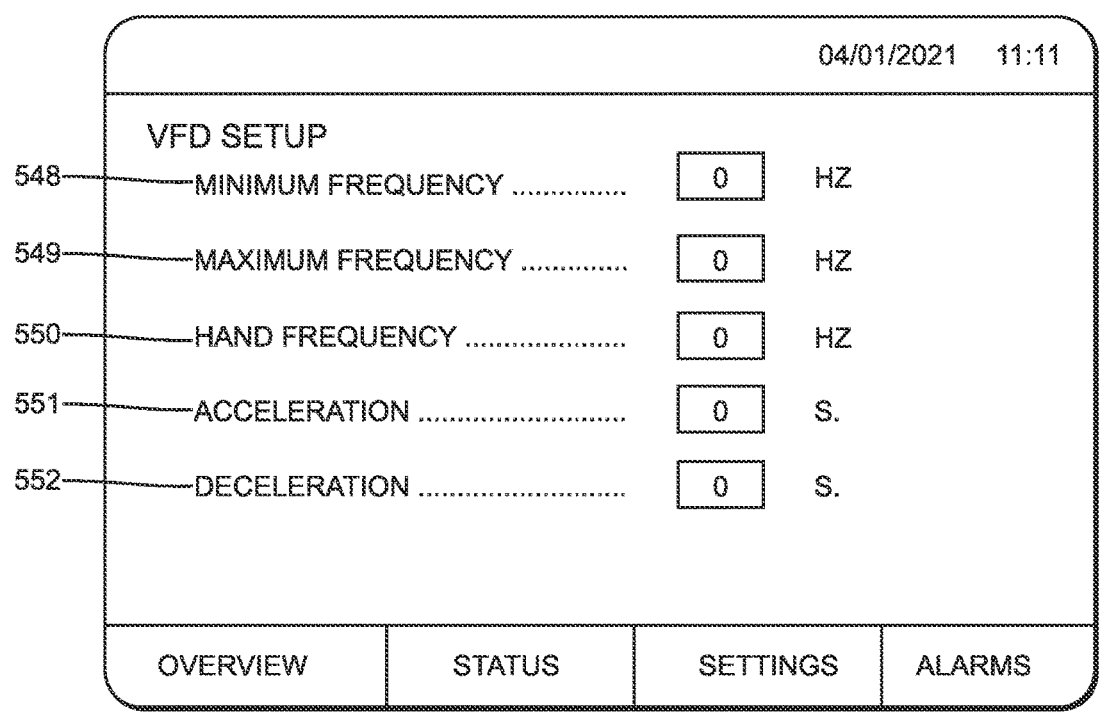
FIG. 5S is a front view of a control center user interface according to an embodiment of the invention.
Figure 5T:
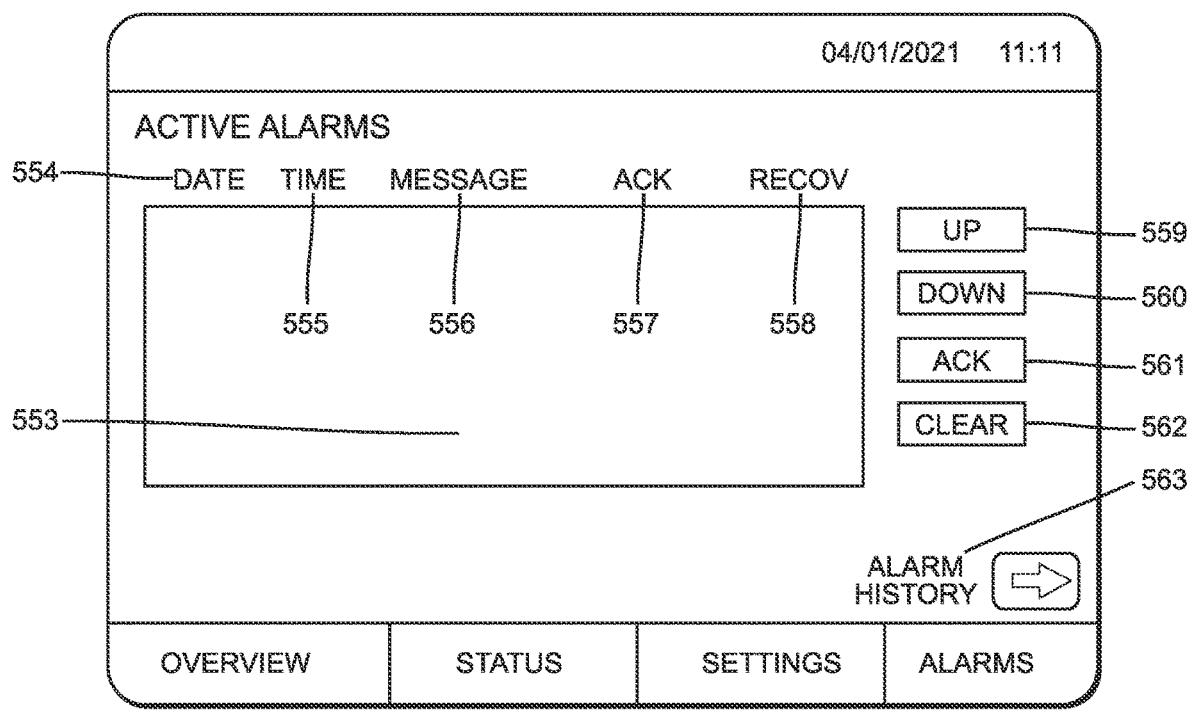
FIG. 5T is a front view of a control center user interface according to an embodiment of the invention.

FIGS. 5A-5T illustrate the functionality of the user interface 425 on the control center 301. An overview of the user interface 425 functionality correlates with an overview of the functionality of the control center 301 as a whole. As described, the control center 301 operates the speed and frequency of the VFDs which in turn operate the controllable valves 319, 320 and pump 304. The controllable valves 319, 320 and motors perform preprogrammed levels of operation based on communication from the pressure transducer 315, the pump 304, the controllable valves 319, 320, and related sensors.

The control relays 414 activate various actuators within the system 100 based on instruction sets associated with preprogrammed threat levels. The control relays 414 may actuate at least one motor and the plurality of controllable valves within the mechanical system hub 101 to guide water along the first or second track 391, 392 according to the instruction sets received. The preprogrammed threat levels may be received by the antenna 423 and the cellular module 401 to activate the system 100 accordingly. By way of non-limiting example, the control center 301 may receive messaging from the cloud in the form of a JSON or other programming language file. The JSON file may be reformatted into a communication protocol such as MODBUS for instruction sets to be carried out by a controller in the control center 301. Although instruction sets may be received remotely to be performed by the control center 301, the user interface 425 of the control center 301 may provide a means for reviewing system status and for manual overrides of preprogrammed or remotely communicated instruction sets.

FIGS. 5A-5B depict an overview screen of the user interface 425. As shown, a current schedule 501 may be displayed showing the operating schedule of the loads based on a current threat level. Users may be given access levels 502, which may be displayed along with the date/time 503 along the top of this screen. Also displayed may be a menu bar at the bottom allowing user access to a login/logout 504, system status 505, system settings 506, and alarms 507. In some instances, a fault indicator 508 may be displayed as well as an alarm indicator 509 indicating when a fault or alarm are present.

FIG. 5C shows a status screen 510, which may display the current state of each load. By way of non-limiting example, this may be whether the pump 304 is running, off, or fault status and whether the solenoids, actuators, and injector are on or off.

FIG. 5D shows a screen that may be a pump status screen. This screen may indicate the run status 511 of the pump 304 including running, off, or fault. It may also display the overload status of the pump 304 including normal, and fault as well as the VFD fault status 513 including normal and fault, and the VFD output frequency 514.

FIG. 5E illustrates a screen that may be a pressure status screen that may show the current pressure level 515 in psi as well as the transducer signal level 516.

FIG. 5F shows a screen that may be a settings screen enabling a user to navigate to an admin setup 517, a load control 518, a schedule 519 for system frequency, a fire radius setting 520 to setup fire distances for system 100 action or inaction, a PID setup, a pressure setup 522, and a VFD setup 523.

FIG. 5G shows a screen that may represent an administrative setup whereby a user may navigate to name the control panel 524, set a password 525, reset the system 526, and view the software and product version 527 running the control center 301. FIG. 5H shows a representation of a user naming their control panel 528. This may assist the system 100 with recognizing and organizing a user's system 100 as well as may assist a user with differentiating between systems 100 if multiple systems are owned.

FIG. 5I shows a screen that may represent a load control. This screen may include a system mode toggle 529 allowing a user to set the system operational status as they see fit. The default mode may be set to "auto" allowing the system to autonomously perform according to instruction sets correlating to predetermined threat levels. However, the individual loads may be adjusted between hand, off, and auto. A user may also be able to override the system with a system single run 530 allowing the system to run once when manually activated. The operation mode 531 may allow for a hand, off, and auto selector switch to be manually adjusted for each load individually, while the status 532 may display the status of each load.

FIG. 5J may illustrate a system single run operation 533. This may run the system 100 for the time specified by the user. In some embodiments, the system mode must be set to auto. After a single run operation, the system 100 may return to auto operation. However, in some embodiments, if a fire danger level is present, a single run operation may be ignored. The single run operation may be used more often for testing purposes.

FIG. 5K illustrates what a selector switch window 534 may look like. In this example it is a pump 304. This type of drop down may be available for each displayed load to control its functionality.

FIG. 5L shows a system selector switch 535 allowing a user to set the system operation mode. By way of non-limiting example, the default may be set to auto. In this setting the system 100 will respond based on preprogrammed threat levels. A manual setting may allow for a user to individually set each load to hand, off, or auto. Furthermore, hazard threat levels may be set by the user including adding threat levels, removing threat levels, and changing the parameters of the threat levels.

FIG. 5M illustrates a screen whereby a user may schedule the time and frequency of the run times for the system 100 during correlated threat levels. This screen displays the fire radius for each threat level 536 and the corresponding schedule times 537, which may be user adjusted.

FIG. 5N illustrates a level 4 operation screen whereby a user may confirm or cancel a level 4 response 538. As will be described in more detail hereinafter, threat level 4 may indicate the system 100 is to take particular action including perimeter defense.

FIG. 5O illustrates a screen that may allow for a user-controlled system reset 539.

FIG. 5P illustrates a screen that may allow for a user to manipulate the hazard radius relative to a structure 135. The danger level radius field 540 may allow for a user to set a distance for system action based on user preference rather than the default radii preprogrammed by the system. This may allow for a user to increase or decrease the calculated distance away from a structure 135 relative to a hazard to prompt the system 100 to take the appropriate action corresponding to a particular threat level at a distance chosen by the user.

FIG. 5Q shows a screen illustrating the PID setup. As shown, a user may enter the proportional gain 541, which must be a number greater than zero or else the pump 304 will not run. The PID loop's integral time 542 may be adjusted as well as the PID loop's differential time 543 and the PID loop's deadband range 544.

FIG. 5R illustrates a pressure setup screen whereby the transducer's maximum range 545 may be entered in psi. Also, a transducer's read frequency 546 for the rate at which the transducer's level is read may be entered in seconds. Also, a pressure setpoint 547 may set the target pressure for the system.

FIG. 5S illustrates a VFD setup screen whereby the VFD minimum and maximum frequencies 548, 549 may be entered in Hz, the head frequency 550 may be entered for the frequency at which the pump should operate in "hand" mode. In this embodiment, the range must be greater than minimum 548 and less than maximum 549 frequency. Also, the rate of acceleration 551 at start up and the rate of deceleration 552 at shut down may be adjusted.

FIG. 5T shows an active alarm screen whereby a list of active alarms 553 may be displayed. Active alarms may be listed in this section and recovered alarms may be automatically removed. The date and time 554, 555 of alarms may be displayed along with the alarm message 556, the time the alarm was acknowledged 557, the time the alarm was recovered 558, navigational means through the alarm list 559, 560, a button to acknowledge the alarm 561, a clear button 562 and a means to navigate to the alarm history 563.

One skilled in the art will appreciate that the user interface 425 and accompanying display screens may be designed with different configurations, but the functional and control principles may remain the same.

FIGS. 6A-6G illustrate a more in-depth view of one type of spray nozzle used within the system 100 and its configuration. Pitched roof sprinklers 176 and their associated configuration are shown and described.

Figure 6A:
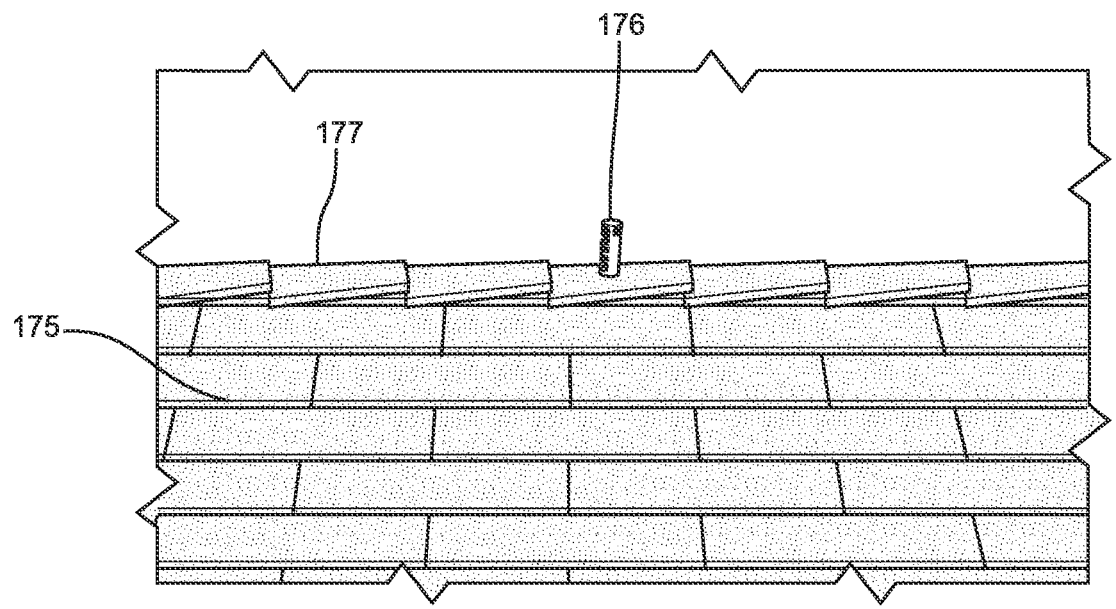
FIG. 6A is an environmental view of a system nozzle on a rooftop used by the structure and curtilage protection system according to an embodiment of the invention.
Figure 6B:
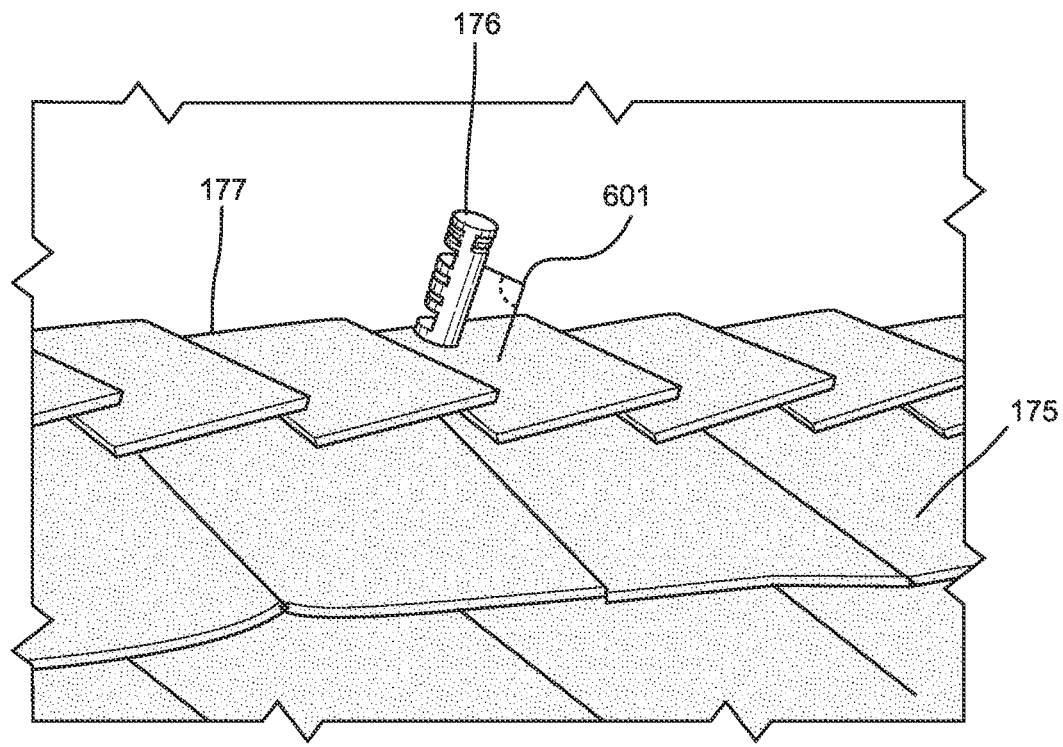
FIG. 6B is an environmental view of a system nozzle on a rooftop used by the structure and curtilage protection system according to an embodiment of the invention.

FIGS. 6A and 6B show a pitched roof sprinkler 176 protruding through the roof's ridge 177. The construction of the pitched roof sprinkler 176 allows for it to be seamlessly integrated into the roof tiling and roof's ridge 177. As shown by FIG. 6B, in some embodiments the pitched roof sprinkler 176 may be angled 601 toward one side of the pitched roof 175. By way of non-limiting example, this angle 601 may fall within a range between 15 and 35 degrees relative to the side of the pitched roof 175 to which it is biased. This angle 601 may allow for the pitched roof sprinkler 176 to blanket liquid on the biased side of the pitched roof 175. In some configurations, a pitched roof 175 may stagger the bias of the pitched roof sprinklers 176 so that both pitched sides of the roof may be blanketed with liquid.

Figure 6C:
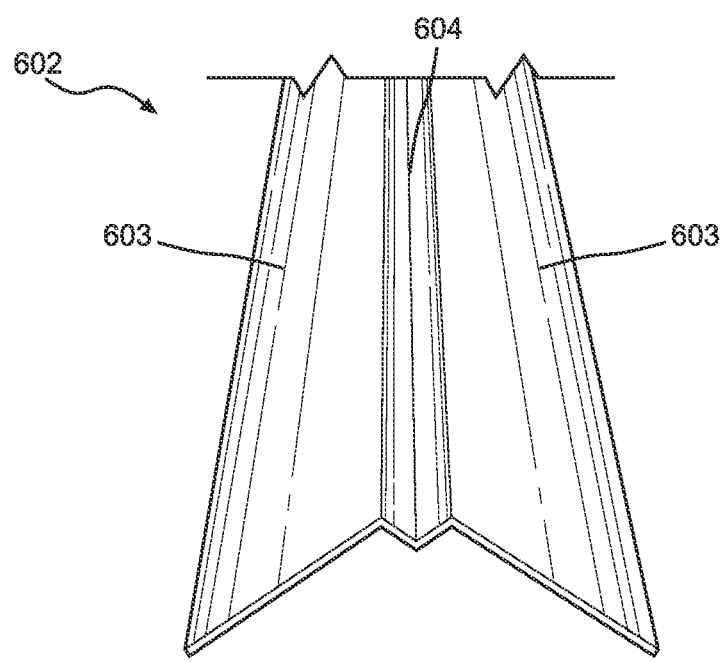
FIG. 6C is a top perspective view of a rooftop flashing used by the structure and curtilage protection system according to an embodiment of the invention.
Figure 6D:
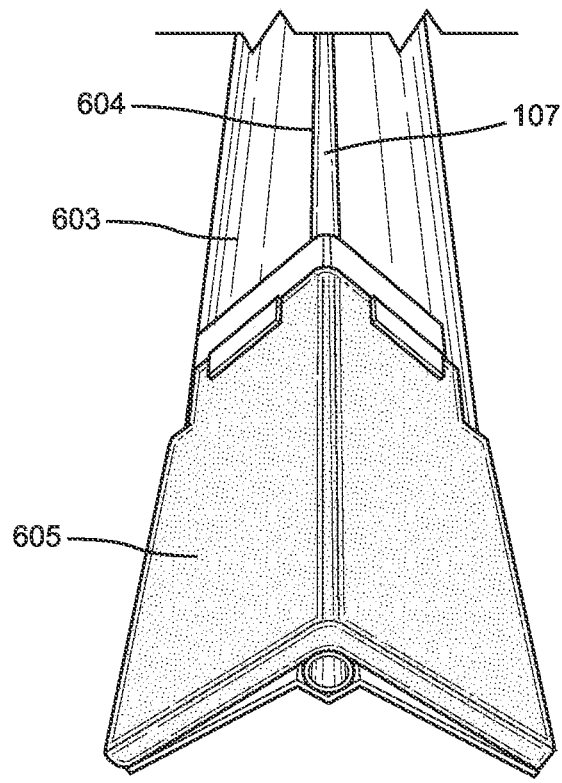
FIG. 6D is a top perspective view of a rooftop flashing used by the structure and curtilage protection system according to an embodiment of the invention.

FIGS. 6C and 6D demonstrate the construction of the pitched roof sprinkler 176 configuration as it pertains to the pitched roof's ridge 177. Referring specifically to FIG. 6C, an M-Shaped flashing 602 may be used to secure a segment of the piped network 107 onto the roof ridge 177 while allowing a plurality of spray nozzles to extend through the exterior surface of the roof ridge 177 at an angle. More particularly, legs 603 of the M-Shaped flashing 602 may mimic the angles of the pitched roof 175 and sit flush against each respective pitched side. An upper portion of the M-Shaped flashing 602 may include an upper channel 604 structured to receive and support the piped network 107 piping thereon.

FIG. 6D demonstrates that in some embodiments, the M-Shaped flashing 602 may be installed over roofing paper and a layer of shingles. A section of the piped network 107 may lay within the upper channel 604. A roof covering 605 that may consist of a ridge cap shingle, ridge tile or custom cap shingle may be installed overtop of the M-Shaped flashing 602 and piping to camouflage the system on the roof ridge 177. The piping on the roof ridge 177 may be divided into sections between pitched roof sprinklers 176. This may assist with biasing each pitched roof sprinkler 176 toward a respective pitched side. It should be noted that the M-Shaped flashing 602 may be used in the construction of a new structure 135 or used as an upgrade to an existing structure 135.

However, in some embodiments, the piped network 107 may be integrated into the construction of the new structure 135. By way of non-limiting example, the piped network 107 may be built into the rough framing of an exterior wall of a new structure 135. Vertical piping 102 may run between framing studs and may continue to an attic type space. A combination of lateral piping 104 and angled piping 108 may also be infused into the construction as needed.

Figure 6E:
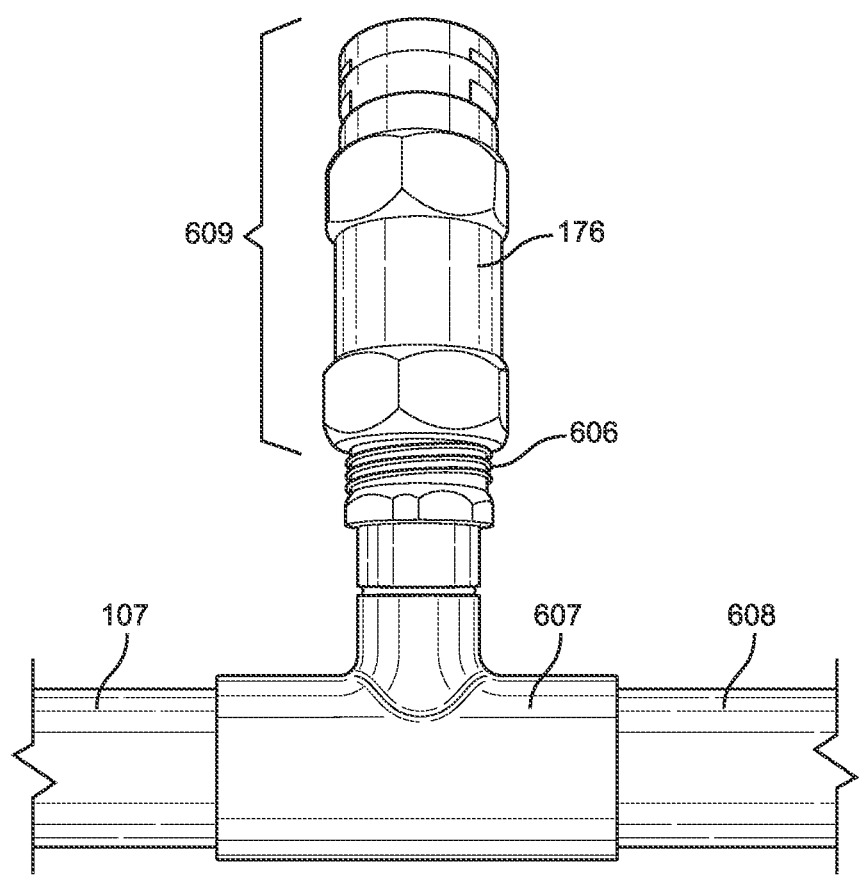
FIG. 6E is a side perspective view of a system nozzle and piping segment used by the structure and curtilage protection system according to an embodiment of the invention.

FIG. 6E illustrates how a pitched roof sprinkler 176 may attach to the piped network 107. A T-fitting 607 may be used between piped sections 608 that may extend a pitched roof sprinkler 176 distally from the piped network 107. The pitched roof sprinkler 176 may attach to the T-fitting by threading 606, friction fit, soldering, and the like. The exposed segment 609 of the pitched roof sprinkler 176 may be the portion that protrudes through the roof ridge 177 and in some instances may be the only visible portion of the piped network 107 thereon. In some embodiments, the T-fitting 607 may be rotated toward a pitched roof side with respect to its flanked piped sections 608. This may bias the pitched roof sprinkler 176 toward that respective side. Therefore, each pitched roof sprinkler 176 may have a staggered angle bias with respect to another.

Figure 6F:
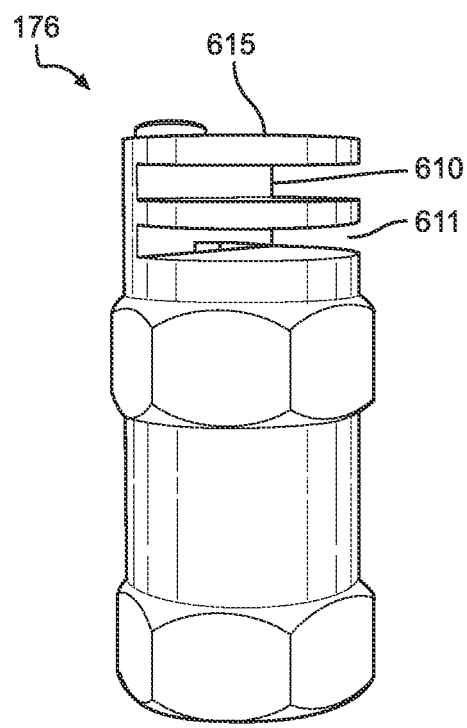
FIG. 6F is a side perspective view of a side perspective view of a system nozzle used by the structure and curtilage protection system according to an embodiment of the invention.
Figure 6G:
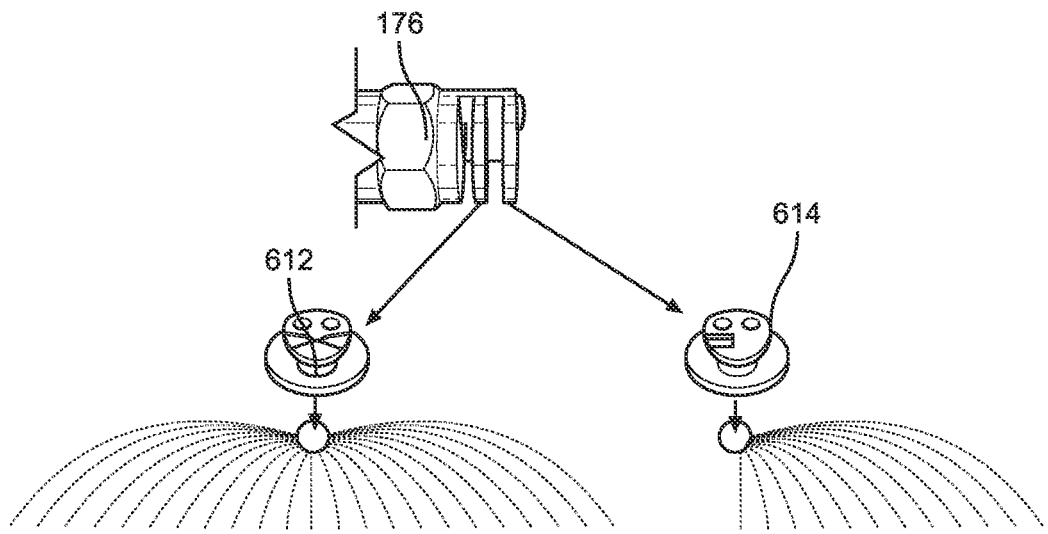
FIG. 6G is an environmental view of a system nozzle used by the structure and curtilage protection system according to an embodiment of the invention.

FIGS. 6F and 6G illustrate how the pitched roof sprinklers 176 may be versatile in their configuration. As shown, an upper portion 615 of the pitched roof sprinkler 176 may include at least one adjustment member 610 and at least one spray guide 611. The adjustment member 610 may be rotated to direct liquid through the spray guide 611 at varying degrees. FIG. 6G demonstrates that the spray radius 178 may be changed from a 180-degree spray 612 to a 90-degree spray 614. However, varying degrees of spray radius 178 may be implemented depending on need, preference, and circumstance. This type of versatility with the pitched roof sprinkler 176 may assist with covering large segments of a pitched roof 175 and with deploying liquid in non-linear configurations such as at the edge or corner of a pitched roof 175.

Figure 7A:
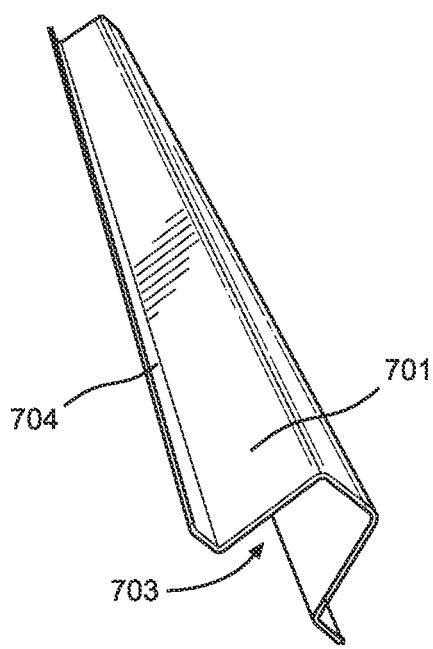
FIG. 7A is a perspective view of piped network covering used by the structure and curtilage protection system according to an embodiment of the invention.
Figure 7B:
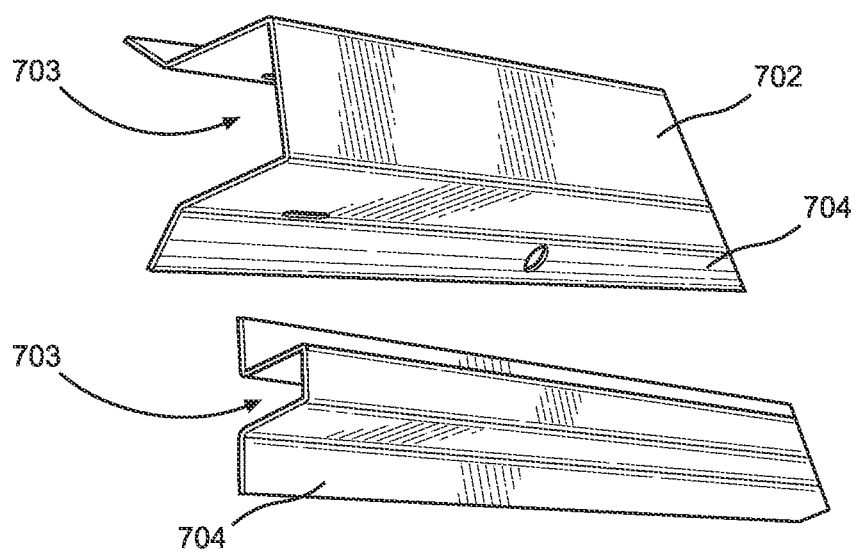
FIG. 7B is a perspective view of piped network covering used by the structure and curtilage protection system according to an embodiment of the invention.

FIGS. 7A and 7B illustrate some of the aesthetic blending components of the system 100. As previously mentioned, a structure 135 may be equipped with faux gutters 701, 702. In some embodiments, this may be raceway or top hat pipe covers whereby segments of the piped network 107 may fit within the covering 703. They may be vertically oriented coverings 701 resembling drainage gutters. They may also be laterally oriented coverings 702 resembling roof gutters. They may also be oriented in various angles throughout a structure 135 to camouflage the piped network 107 with its aesthetic features. The faux gutters 701, 702 may be fastened to the house via side lips 704 extending distally from the coverings giving a platform for the faux gutters 701, 702 to be screwed, nailed, or adhered to a structure 135. They may be painted to match the décor of a structure 135 so that they blend with traditional structural features. In some embodiments, the vertically oriented coverings 701 may run up the side of a structure 135 to the lowest side of a roof concealing the piped network 107. The piped network 107 may then either be covered by a lateral covering 702, or may run underneath the eave or on the fascia board to the end of the roof edge.

As previously mentioned, in some embodiments the faux gutters 701, 702 may act as functioning gutters. In this embodiment, the faux gutters 701, 702 may direct rain water through the covering 703, yet overtop of the piped network 107 to serve the dual purpose of concealing the piped network 107 and draining water.

FIGS. 8A-8E illustrate a characteristic of the system 100 that may further assist with blending it with the aesthetic features of a structure 135, while serving as a support for particularized spray nozzles used on a flat roof 185.

Figure 8A:
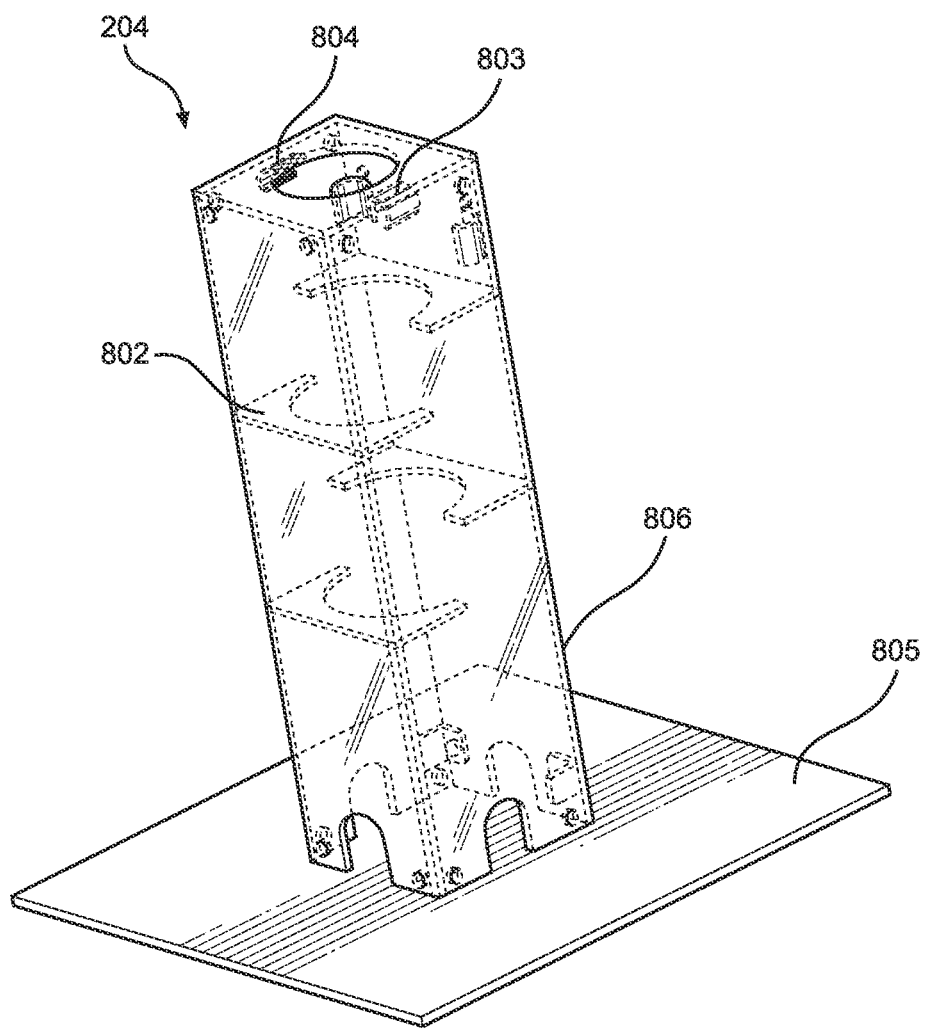
FIG. 8A is a perspective view of a nozzle housing used by the structure and curtilage protection system according to an embodiment of the invention.

FIG. 8A demonstrates a nozzle housing 204 that may be used to support retractable spray nozzles fitted therein. As shown, the nozzle housing 204 may include a top 804, a base 805, and an elongate body 806. In some embodiments, the nozzle body 806 may resemble a rectangular prism and the housing base 805 may resemble a flat square platform. However, one skilled in the art will appreciate that any number of shapes and dimensions may be used to effectuate its purpose.

Further illustrated is that the top 804 may include top braces 803 structured to removably secure the top 804 to the body 806 with a friction fitting. Additionally, the interior of the body 806 may include support brackets 802 structured to align and secure retractable spray nozzles within the nozzle housing 204.

Figure 8B:
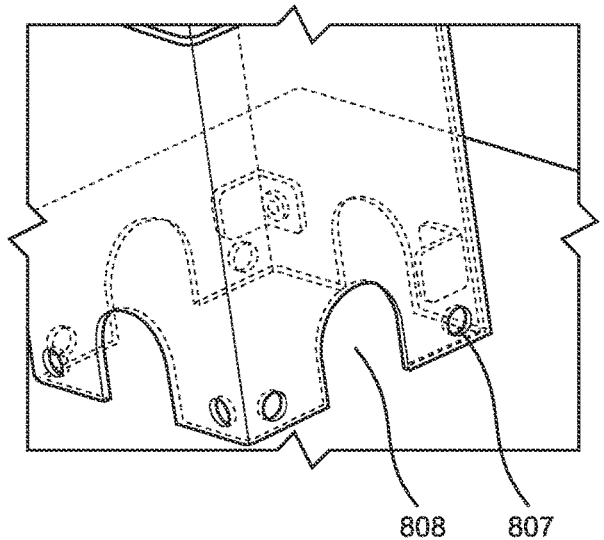
FIG. 8B is a segmented perspective view of a bottom portion of a nozzle housing according to an embodiment of the invention.
Figure 8C:
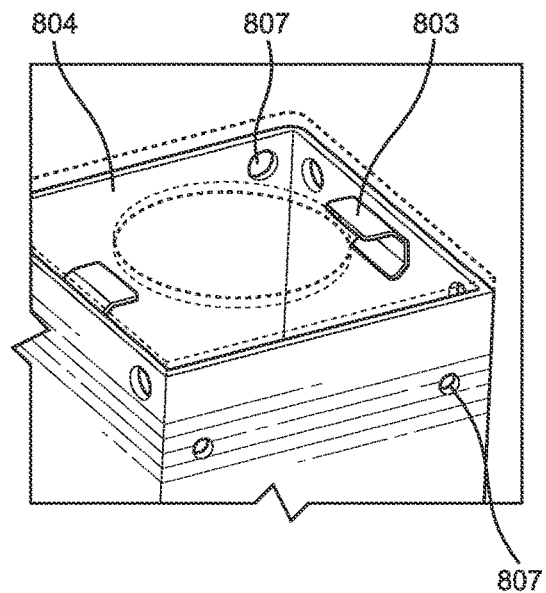
FIG. 8C is a perspective view of a top portion of a nozzle housing according to an embodiment of the invention.

FIGS. 8B and 8C show an enlarged section of an upper portion and bottom portion of the nozzle housing 204. FIG. 8B shows that the bottom of the housing body 806 may include arched notches 808 structured to allow for segments of the piped network 107 to fit therethrough. Furthermore, in some embodiments the body 806 may include bottom and top venting apertures 807. However, these venting apertures 807 may not be present in all embodiments and may be used depending on need, preference, and circumstance.

Figure 8D:
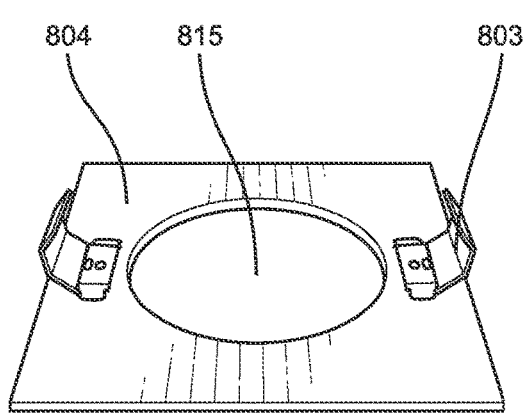
FIG. 8D is a perspective view of the underside of a nozzle housing top according to an embodiment of the invention.

FIG. 8D shows the underside of a top 804 that has been removed. The removable nature of the top 804 facilitates the ability to perform maintenance on the interior of the nozzle housing 204 as well as on the nozzle itself without having to completely remove the nozzle housing 204. Further illustrated is that the top 804 may include a permeation hole 815 allowing the hosted nozzle to permeate through the top 804 and retract back into the body 806 as needed.

Figure 8E:
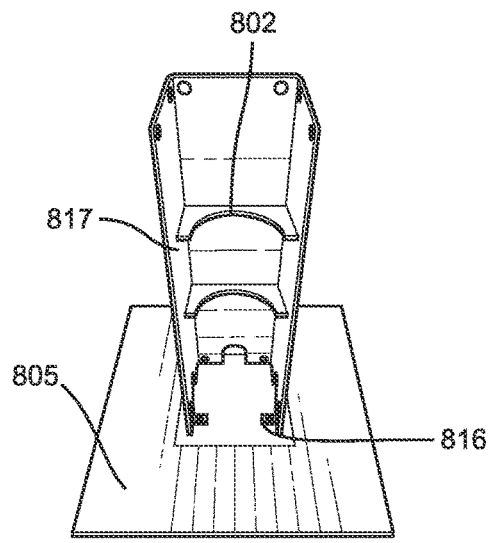
FIG. 8E is a front perspective view of the inside of a nozzle housing with side door removed according to an embodiment of the invention.

FIG. 8E demonstrates that the body 806 may have at least one removable side 817. The removable nature of at least one side as well as the top 804 further facilitates the ability to perform maintenance on the interior of the nozzle housing 204 and the nozzle itself. Also illustrated is that the brackets 802 may include semicircular notches structured to encircle at least a portion of a nozzle thereby holding a nozzle in place. Further shown is that the body 806 may be securely fastened to the removable side 817 via screws through attachment lips 816. However, one skilled in the art will appreciate that the body 806 may be attached by means of soldering, adhesive, nails and the like.

Figure 9A:
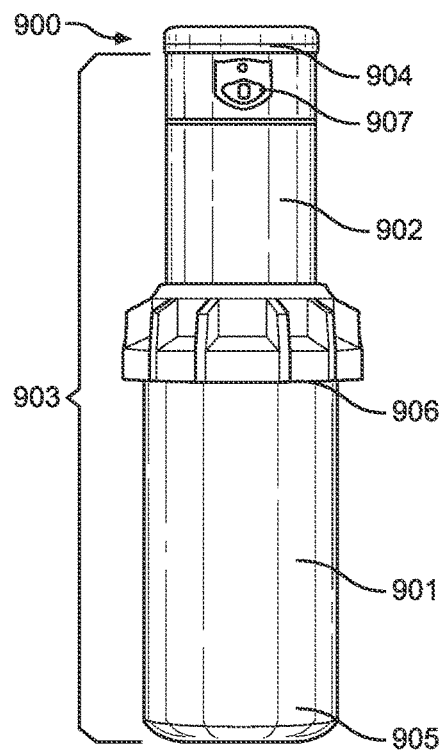
FIG. 9A is a front perspective view of a retractable spray nozzle used by the structure and curtilage protection system according to an embodiment of the invention.

FIG. 9A illustrates another type of spray nozzle used within the system 100. As demonstrated a retractable spray nozzle 900 may be used and may include a sprinkler top 904, a sprinkler bottom 905, and a sprinkler body 903. The sprinkler body may include a sprinkler base 901, a sprinkler midsection 906, and a sprinkler head 902. The sprinkler base 901 may include an interior hollow elongate chamber sized to accommodate the sprinkler head 902 therein. The sprinkler head 902 may slidably fit into the sprinkler base 901 when not activated for use and the sprinkler top 904 may fit flush with the sprinkler midsection 906 effectively halving the size of the sprinkler 900. When activated for use, the sprinkler head 902 may emerge from within the sprinkler base 901 to extend the length of the retractable spray nozzle 900. Liquid may be discharged out from a spout 907 proximate the sprinkler top 904. In some embodiments, the sprinkler head 902 may rotate to allow for dispersal of liquid around its rotational axis. In other embodiments, the sprinkler head 902 may be fixed so that liquid is controlled in a more intentional direction.

Figure 9B:
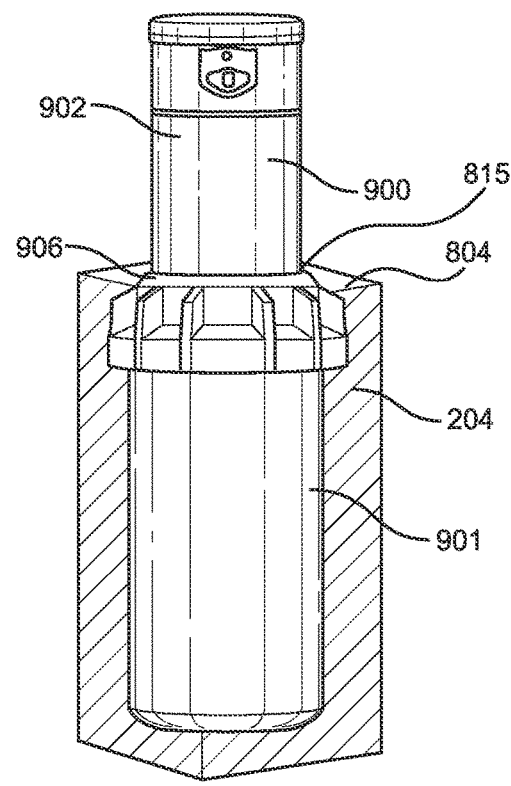
FIG. 9B is a front perspective view of a retractable spray nozzle in a nozzle housing used by the structure and curtilage protection system according to an embodiment of the invention.
Figure 9C:
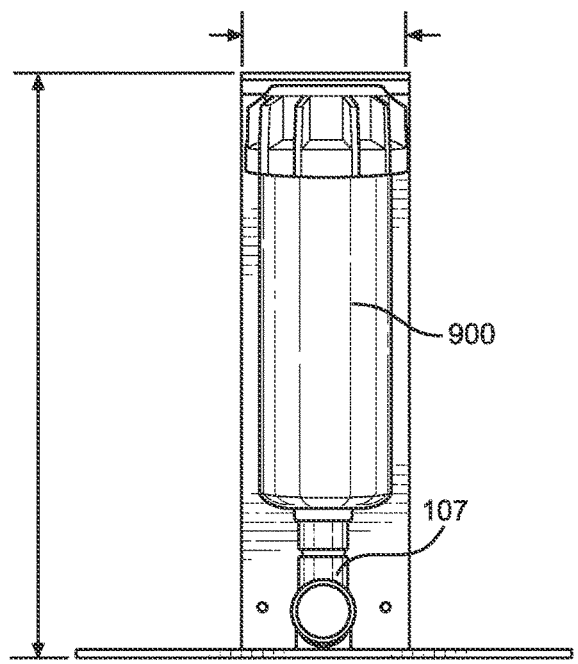
FIG. 9C is a front perspective view of a retractable spray nozzle and piping segment used by the structure and curtilage protection system according to an embodiment of the invention.

FIG. 9B shows the retractable spray nozzle 900 positioned within a nozzle housing 204. As shown, the sprinkler base 901 may fit within the nozzle housing 204, and in combination with the sprinkler midsection 906 may be the same or similar longitudinal length as the nozzle housing 204. Therefore, the nozzle midsection 906 may abut, or be proximate to the housing top 804. The sprinkler head 902 may be structured to permeate through the permeation hole 815 of the nozzle housing top 804 allowing the sprinkler head 902 to permeate through the nozzle housing top 804 and retract back into the nozzle housing body 806 as needed. In some embodiments, the sprinkler top 904 may serve as a means to seal the permeation hole 815 when the sprinkler head 902 is retracted into the sprinkler base 901 and the nozzle housing 204.

FIG. 9O illustrates the retractable spray nozzle 900 attached to the piped network 107. Similar to the pitched roof sprinkler 176, the retractable spray nozzle 900 may be fitted to the piped network 107 via T-fitting 607 thereby extending the retractable spray nozzle 900 distally therefrom. The retractable spray nozzle 900 may attach to the T-fitting by threading 606, friction fit, soldering, and the like.

Figure 9D:
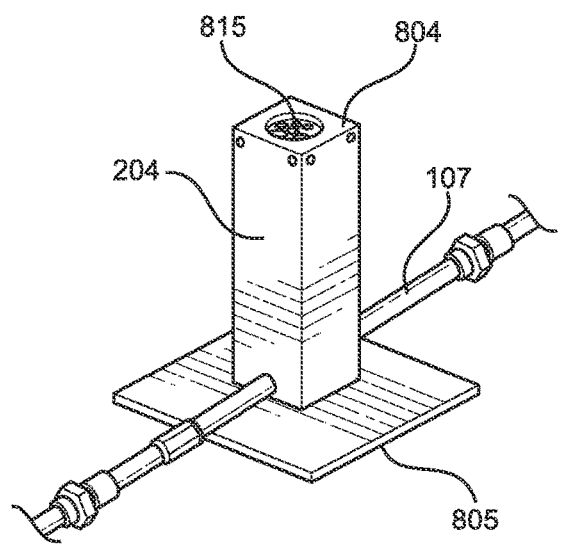
FIG. 9D is a perspective environmental view of a nozzle housing used by the structure and curtilage protection system according to an embodiment of the invention.

FIG. 9D is an environmental view of the nozzle housing 204 combined with the piped network 107 as used within the system 100. As shown, the housing base 805 may fit flush against a flat roof 185. The piped network 107 may enter the nozzle housing 204 via the arched notches 808 in order to connect to the retractable spray nozzle 900. The retractable spray nozzle 900 may be stabilized therein as previously described. The retractable spray nozzle 900 in this view is shown as being retracted within the nozzle housing 204. Once activated, the sprinkler head 902 may permeate through the permeation hole 815 of the nozzle housing top 804 allowing the retractable spray nozzle 900 to disperse liquid onto the flat roof 185.

FIG. 10 illustrates the hierarchy of hazard levels that may serve as the basis for deliverable instruction sets to the system 100 in order for the system 100 to take relative automated action. The system 100 is structured to autonomously take action depending on the hierarchy of preprogrammed threat levels. In one embodiment, the hazard levels may be separated between levels 0-5, with hazard level 4 divided between two sublevels, 4a and 4b. Hazard level 0 may indicate that there is no fire within relative proximity. Therefore, the controllable valves 319, 320 within the system 100 may be closed and the system 100 may lay dormant and remain at a consistent psi, for example 65 psi.

Hazard level 1 may indicate that a fire has been detected within a distance, for example a four-mile radius of a structure 135. Instruction sets may then be sent from a central server hosting a user control portal, to the control center 301 to autonomously activate the system 100 along the first track 391 with pure water flow to the eaves 160 and to the roof 175, 185 for a time duration and interval, for example five continuous minutes at 1-hour intervals. The system 100 may remain at its pre-hazard psi level, for example 65 psi, and the second track 392 may remain closed.

Hazard level 2 may indicate that a fire has been detected within a distance, for example a three-mile radius of a structure 135. Instruction sets may then be sent to the control center 301 to autonomously activate the system 100 along the first track 391 with pure water flow to the eaves 160 and to the roof 175, 185 for a time duration and interval, for example five continuous minutes at ½ hour intervals. The system 100 may remain at its pre-hazard psi level, for example 65 psi, and the second track 392 may remain closed.

Hazard level 3 may indicate that a fire has been detected within a two-mile radius of a structure 135. Instruction sets may then be sent to the control center 301 to autonomously activate the system 100 along the first track 391 with pure water flow to the eaves 160 and to the roof 175, 185 for a time duration and interval, for example five continuous minutes at 20-minute intervals. The system 100 may remain at its pre-hazard psi level, for example 65 psi, and the second track 392 may remain closed.

Hazard level 4a may indicate that a fire has been detected within a distance, for example a one-mile radius of a structure 135. Instruction sets may then be sent to the control center 301 to autonomously activate the system 100 along the second track 392 to saturate only the curtilage 140 for a single activation, for example one time for five minutes. The control center 301 may also be instructed to drop the psi to, for example 55 psi during hazard level 4a. Furthermore, the first track level 391 may be closed throughout hazard level 4a.

Hazard level 4b still operates on information that a fire has been detected within a distance, for example a one-mile radius of a structure 135. Instruction sets may be sent to the control center to autonomously close the second track 392 after its completion and open the first track 391. The system 100 may then autonomously resume pure waterflow along the first track 391 for a time duration and interval, for example five continuous minutes at 10-minute intervals. Furthermore, the psi may be increased to its pre-hazard psi, for example 65 psi throughout hazard level 4b.

Hazard level 5 indicate that a fire has been detected within a distance, for example a ½ mile radius of a structure 135. Instruction sets may then be sent to the control center 301 to autonomously activate the system 100 along the first track 391 with pure water flow to the eaves 160 and to the roof 175, 185 for a set time period, for example sixty continuous minutes then resort back to level 4b. The system 100 may remain at its pre-hazard psi level, for example 65 psi, and the second track 392 may remain closed.

Although the hazard levels defined above recite specific examples of fire radius distance, duration of activity, and intervals of activity, one skilled in the art will appreciate that these numerical amounts may be adjusted based on need, preference, and circumstance. Furthermore, as was previously described regarding the control center 301 and as will be described further hereinafter, these amounts may be adjusted by the user. Additionally, one skilled in the art will appreciate that there may be more or less hazard levels preprogrammed into the system 100 according to need, preference, and circumstance. By way of non-limiting example, in some embodiments there may be ten hazard threat levels and may be a sublevel 4c hazard threat level in addition to the other sublevels.

Figure 11:
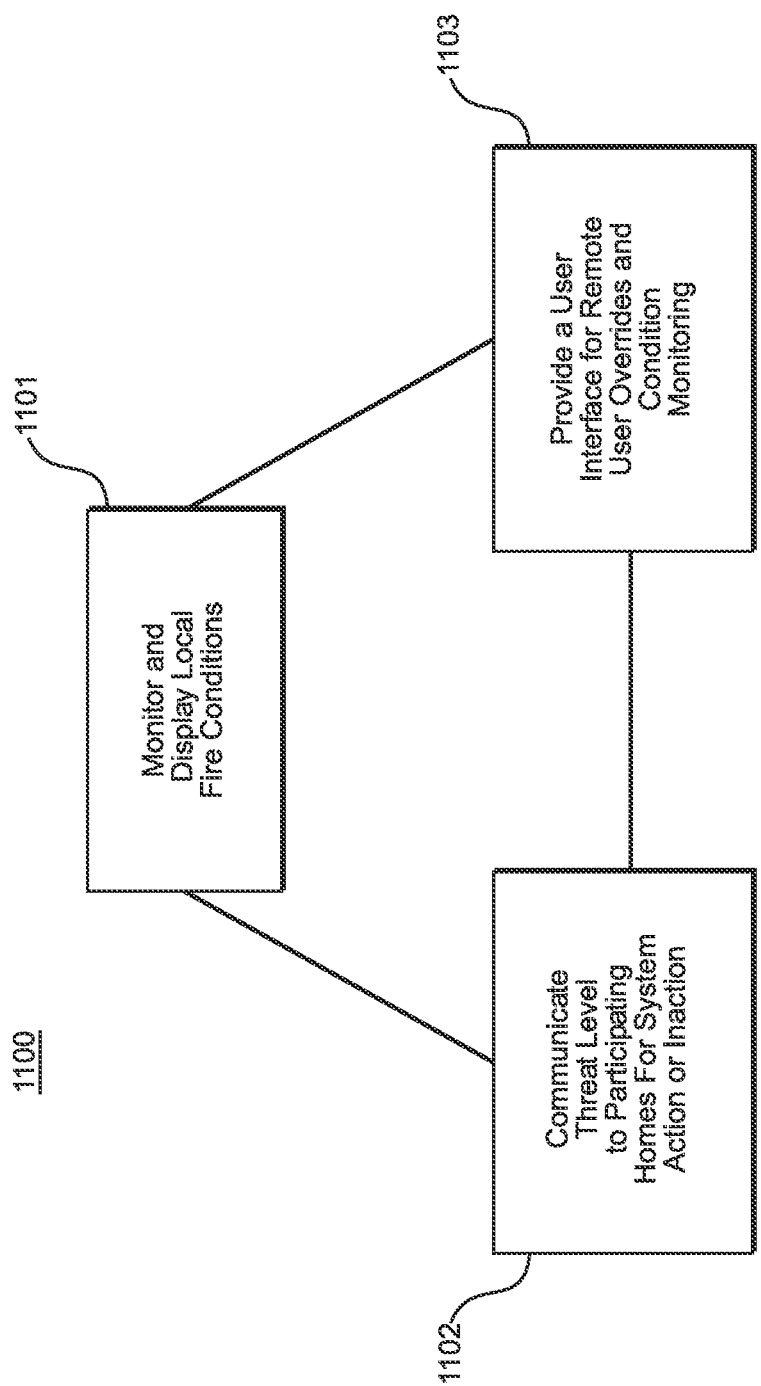
FIG. 11 is a diagrammatic overview of a remote user portal used by the structure and curtilage protection system according to an embodiment of the invention.

FIG. 11 is a diagrammatic overview of a user control portal 1100 that may serve as a remote intelligence hub and information distribution center for the system 100. The user control portal 1100 may include a central server to assist with assessing and processing hazard threat levels, displaying information, and routing instruction sets. The user control portal 1100 may also serve as a means for remote user login and manual overrides of the system 100 as it relates to that user's structure 135.

As such, the user control portal 1100 may monitor and display local fire conditions 1101, communicate threat levels to system participating structures 135 for system action or inaction 1102, and may provide a user interface for remote user overrides and condition monitoring 1103.

The user control portal 1100 may be structured to calculate a threat level based on a hazard's distance from a structure 135 and communicate the threat level to the structure's control center 301 to initiate one of the aforementioned preprogrammed actions relative to the calculated threat level. The user control portal 1100 may be structured to provide a constant web-based monitor of the hazard and threat level and may be operable to alert users of current threat levels via text message, automated phone calls, email, and user login.

By way of non-limiting example, in one embodiment the user control portal 301 may be operable to calculate and categorize a first level threat by averaging at least three distance points from a known active fire relative to a structure 135 and comparing the average to a distance, for example five-mile radius from the structure 135. Similarly, it may calculate and categorize a second level threat by averaging at least three distance points from a known active fire relative to a structure and comparing the average to a distance, for example four-mile radius from the structure 135. It may calculate and categorize a third level threat by averaging at least three distance points from a known active fire relative to a structure 135 and comparing the average to a distance, for example three-mile radius from the structure 135. Further, it may calculate and categorize fourth level threats by averaging at least three distance points from a known active fire relative to a structure 135 and comparing the average to a distance, for example two-mile radius from the structure. Lastly, the user control portal may be operable to calculate and categorize a fifth level threat by averaging at least three distance points from a known active fire relative to a structure 135 and comparing the average to a distance equal to or less than another preset distance, for example one-mile radius from the structure 135.

As previously mentioned, one skilled in the art will appreciate that the hazard levels defined above recite specific examples of fire radius distance, duration of activity, and intervals of activity. However, one skilled in the art will appreciate that these numerical amounts may be adjusted based on need, preference, and circumstance.

The user control portal 1100 may transmit the respective threat level to the control center 301 of a system participating structure 135. In some embodiments, the information may be transmitted by the user control portal 1100 via cellular signal and may be received by the antenna of a cellular module within the control center 301. However, one skilled in the art will appreciate that the information may be transmitted via any number of other means in addition to or instead of cellular signal. By way of non-limiting example, this may be by means of WiFi, LAN or WAN, radio signal, hard-wired electrical connection, or any other means of remotely transmitting information to a structure 135.

In some embodiments the control center 301 will have preprogrammed instruction sets to be carried out automatically by the system 100 based on the threat level that has been received. In other embodiments, the control center 301 will receive the threat level and corresponding instruction sets from the user control portal 1100 to automatically be carried out accordingly. Furthermore, in some embodiments, the control center 301 will have programmed instruction sets to be carried out depending on received threat level communication that are operable to be overridden by instruction sets sent by the user control portal 1100. In other words, a user may override specific instruction sets relative to a particular structure 135 by changing those instruction sets remotely using the user control portal 1100.

Figure 12A:
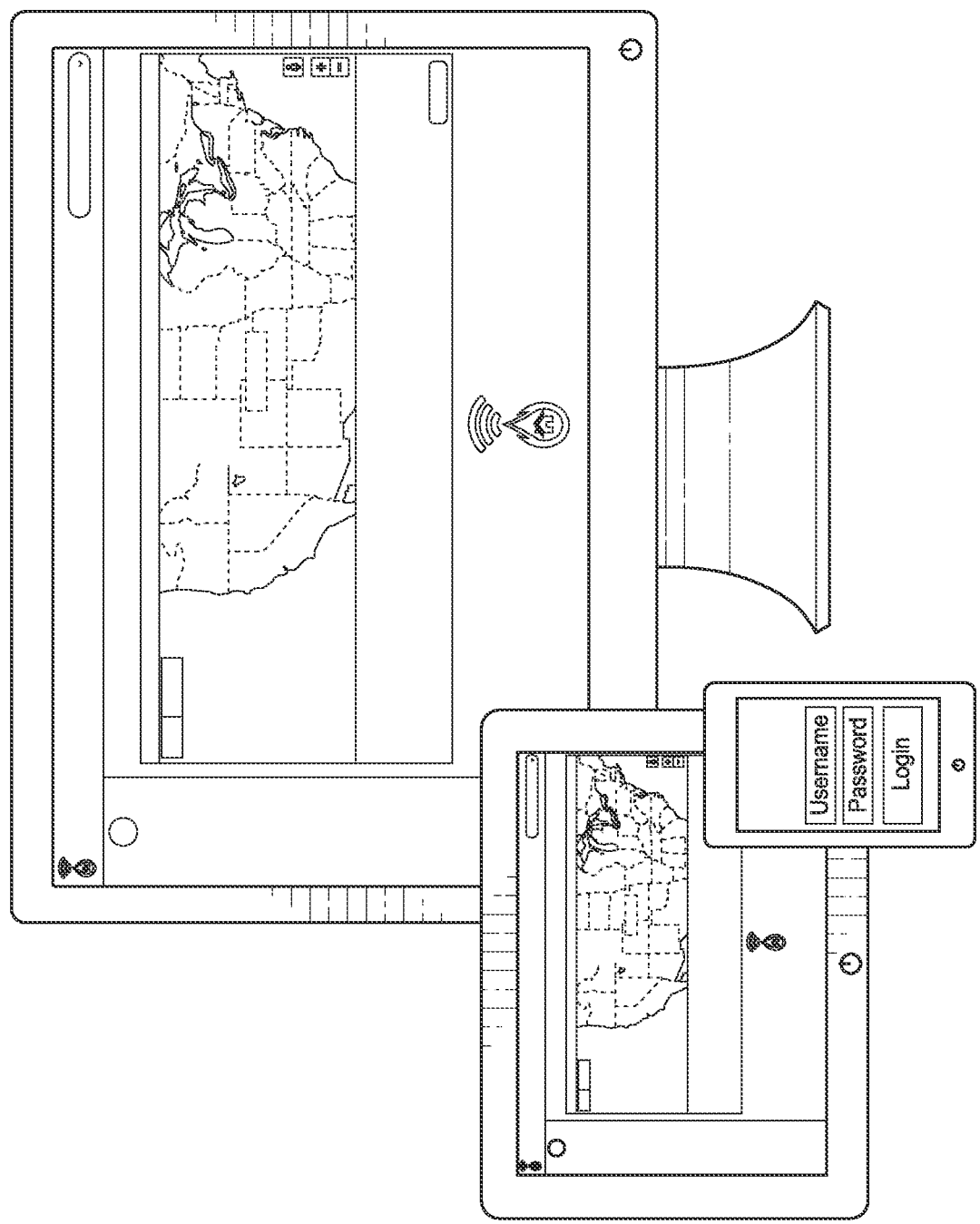
FIG. 12A is a front perspective view of devices that may be used in conjunction with the structure and curtilage protection system according to an embodiment of the invention.

FIG. 12A demonstrates that the user control portal 1100 may be viewed and accessed by any number of computing devices. This facilitates the ability for a user to monitor and control their particular account and participating structure 135 within the system 100.

FIG. 12B illustrates a system configuration page of the user control portal 1100 demonstrating that a user may control their respective schedule for each threat level 1211. In order to get to this page, a user would log into their account 1212, which is linked to their structure 135. In this particular embodiment a user has configured their first threat level to run for five minutes in one-hour increments. This user's second threat level has been set to run for five minutes in half hour increments. Level 3 has been set to run for five minutes every fifteen minutes, and level 4 has been set to run for five minutes every ten minutes. In this embodiment, the system 100 has been configured to not allow a user to adjust level five settings. A user that has configured their settings in this manner would override their structure's 135 preprogrammed threat level configurations with these new terms. Therefore, the user control portal 1100 may automatically forward the corresponding override instruction set to the user's control center 301 to be automatically carried out when required. Although not specifically depicted in FIG. 12B, it should be noted that one skilled in the art will appreciate that in some embodiments this screen may include an adjustable configuration for level 5 similar to the other levels.

Figure 12C:
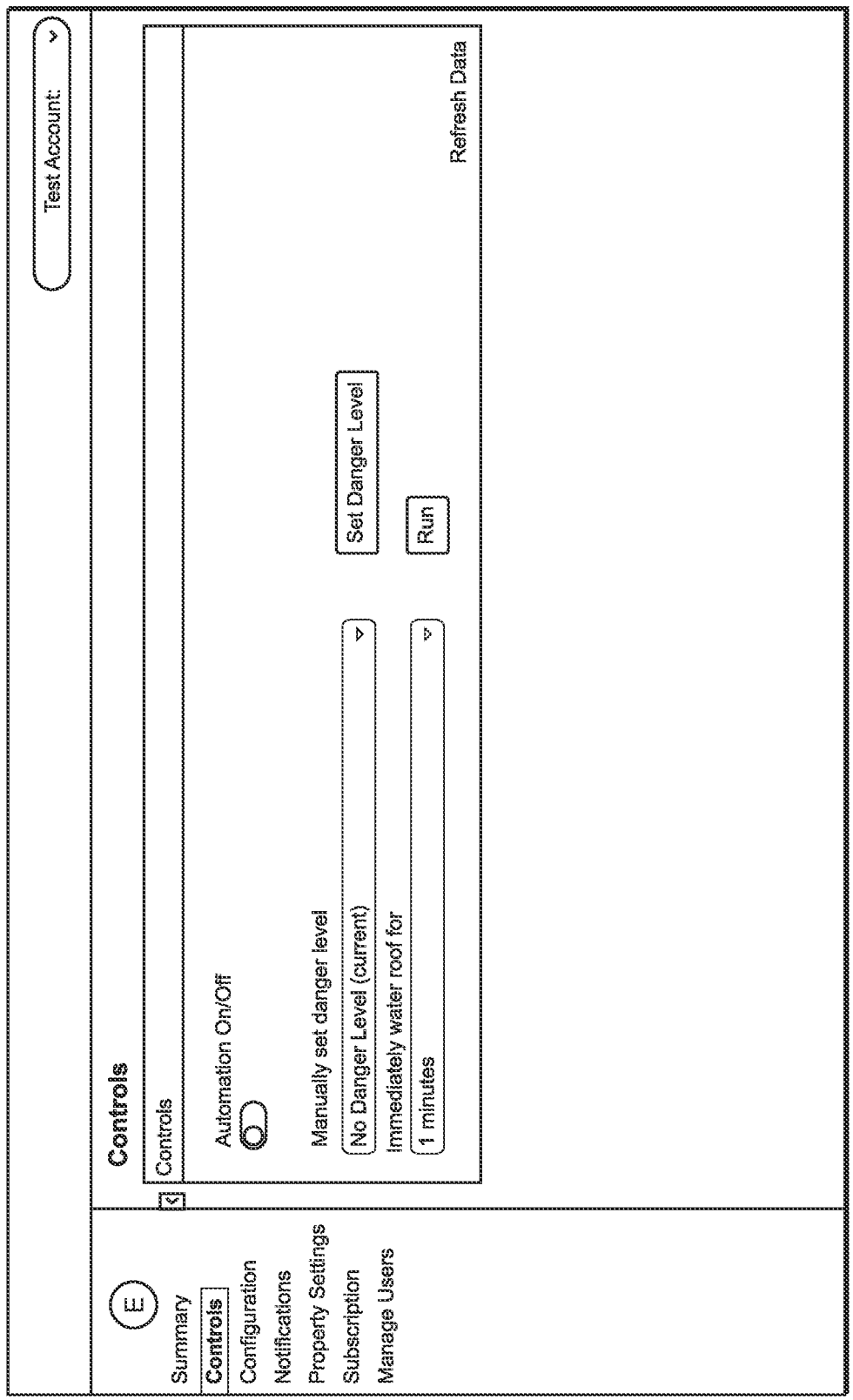
FIG. 12C is a view of a controls page of a remote user portal used by the structure and curtilage protection system according to an embodiment of the invention.

FIG. 12C represents a particular system test page within the user control portal 1100. In this embodiment, a user may test the system 100 based on a specific threat level. By way of non-limiting example, a user may set the threat level to level three for a one time run of 5 minutes. Although not shown in this figure, a chemical infusion test run may be possible as well. By way of non-limiting example, a user may select threat level 4a and a respective duration to test the chemically infused water on the curtilage 140. Also shown is an automation toggle allowing a user to temporarily turn off the automated preprogrammed instruction sets to allow for a test run. This toggle may act as an extra layer of validation before switching a system to test mode. Once tested, the system and the toggle may switch back to "automation on" mode to allow the system 100 to resort back to its preprogrammed default settings.

Figure 12D:
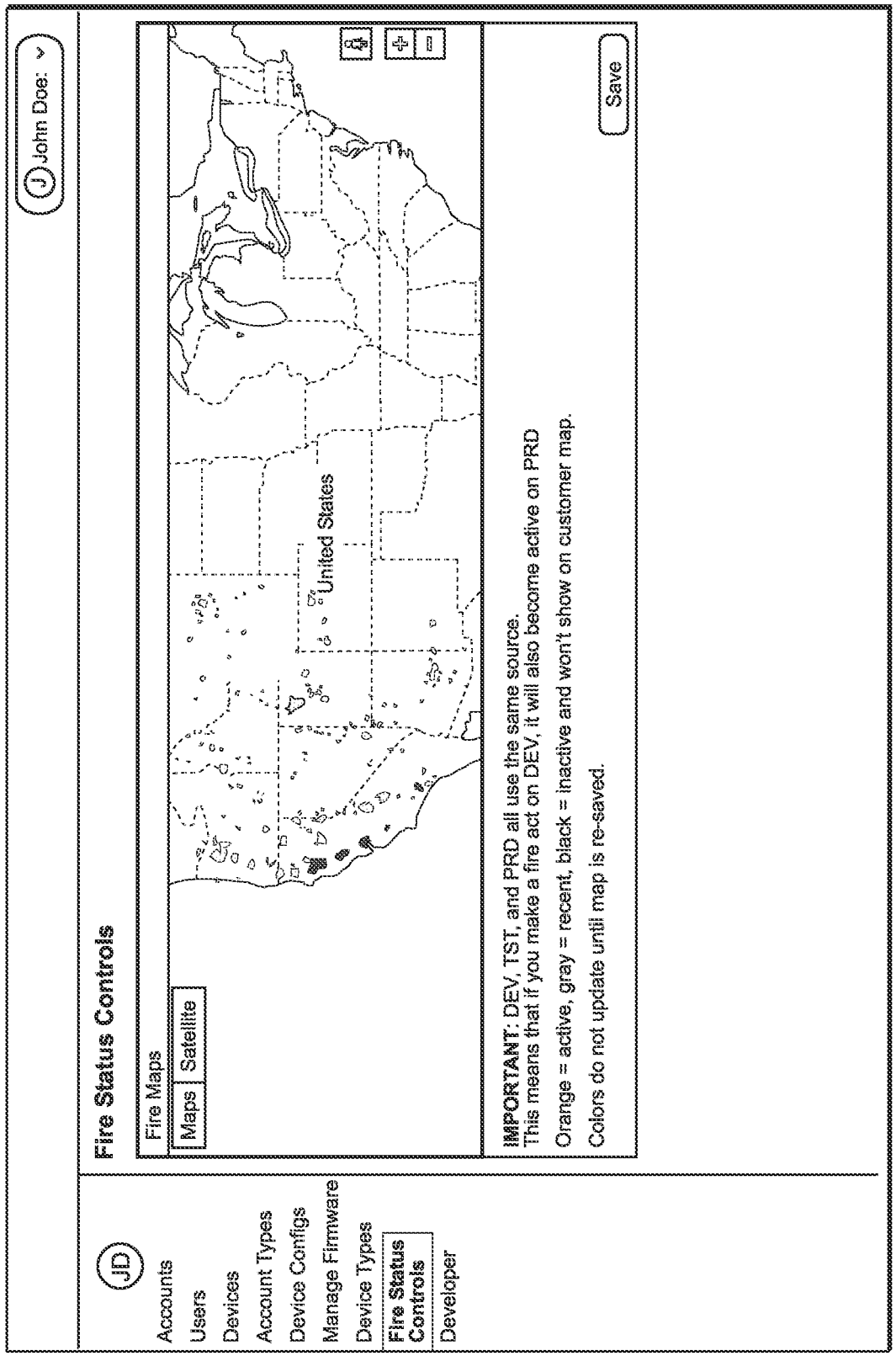
FIG. 12D is a view of a hazard map page of a remote user portal used by the structure and curtilage protection system according to an embodiment of the invention.

FIG. 12D shows an embodiment of the user control portal 1100 whereby there may be a general fire status monitor. This may show a mapped overview of all known active fires within a region. A user may zoom in on any fire to view more details.

Figure 12E:
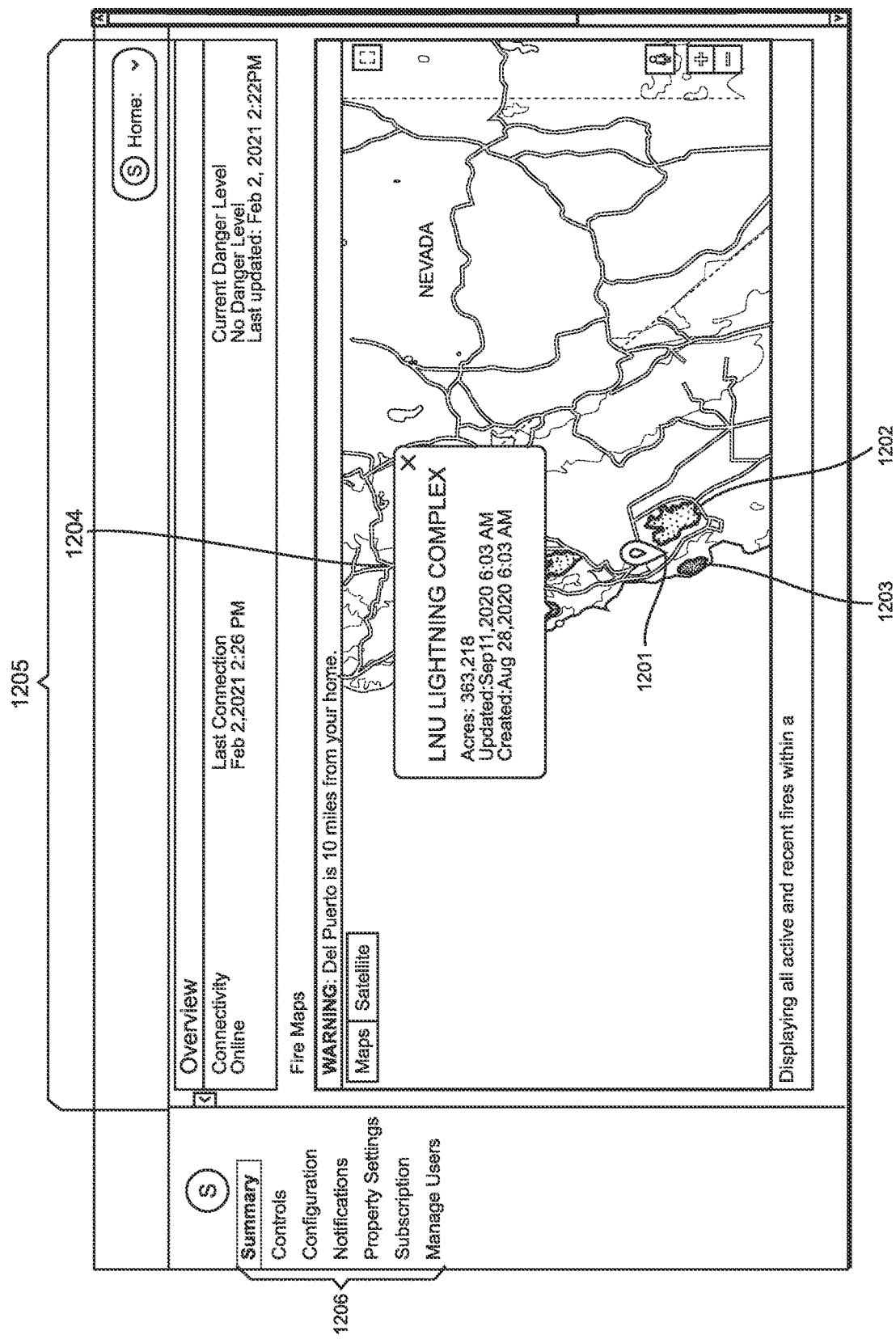
FIG. 12E is a view of an overview page of a remote user portal used by the structure and curtilage protection system according to an embodiment of the invention.
Figure 12F:
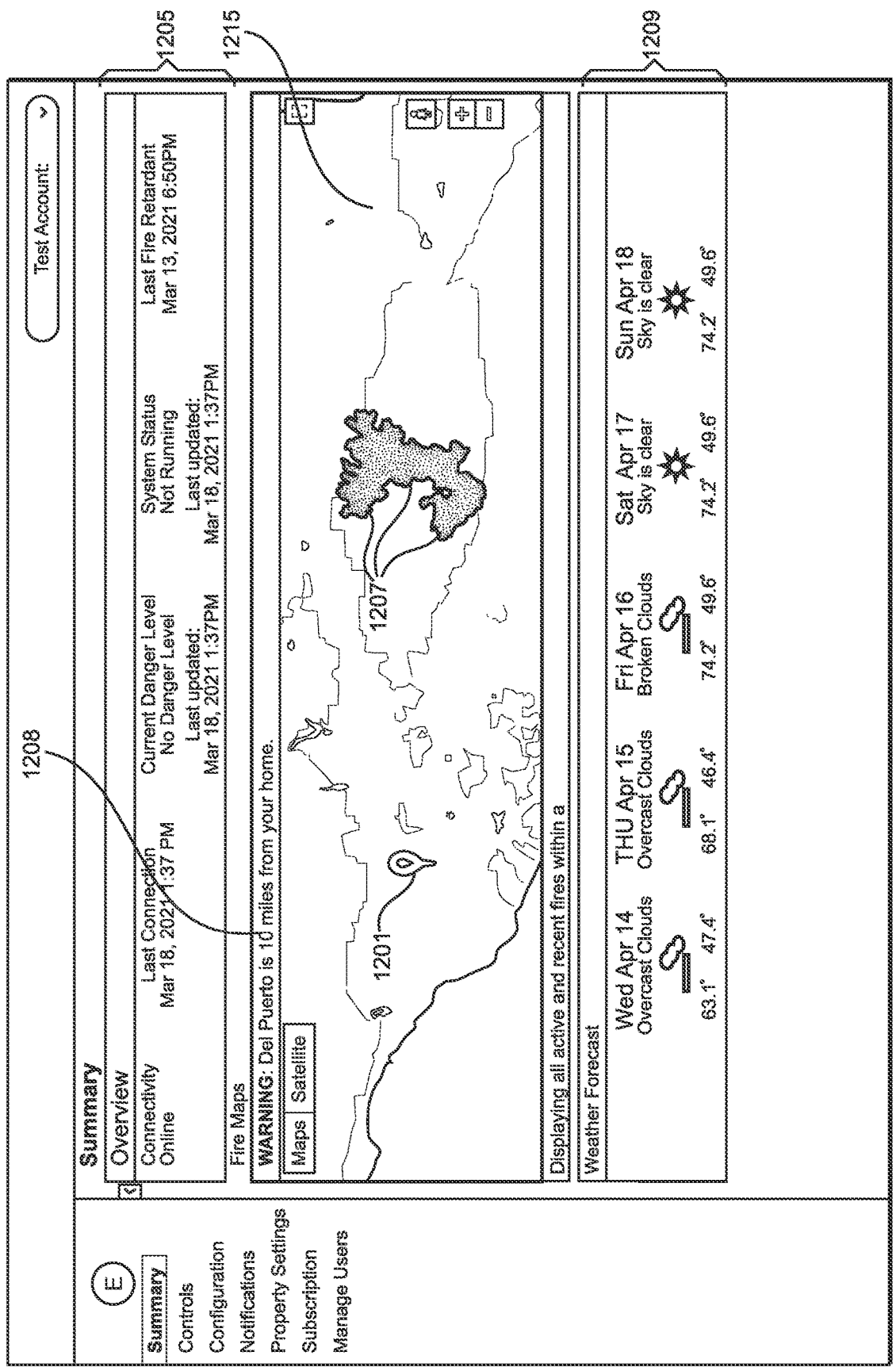
FIG. 12F is a view of an overview page of a remote user portal used by the structure and curtilage protection system according to an embodiment of the invention.
Figure 12G:
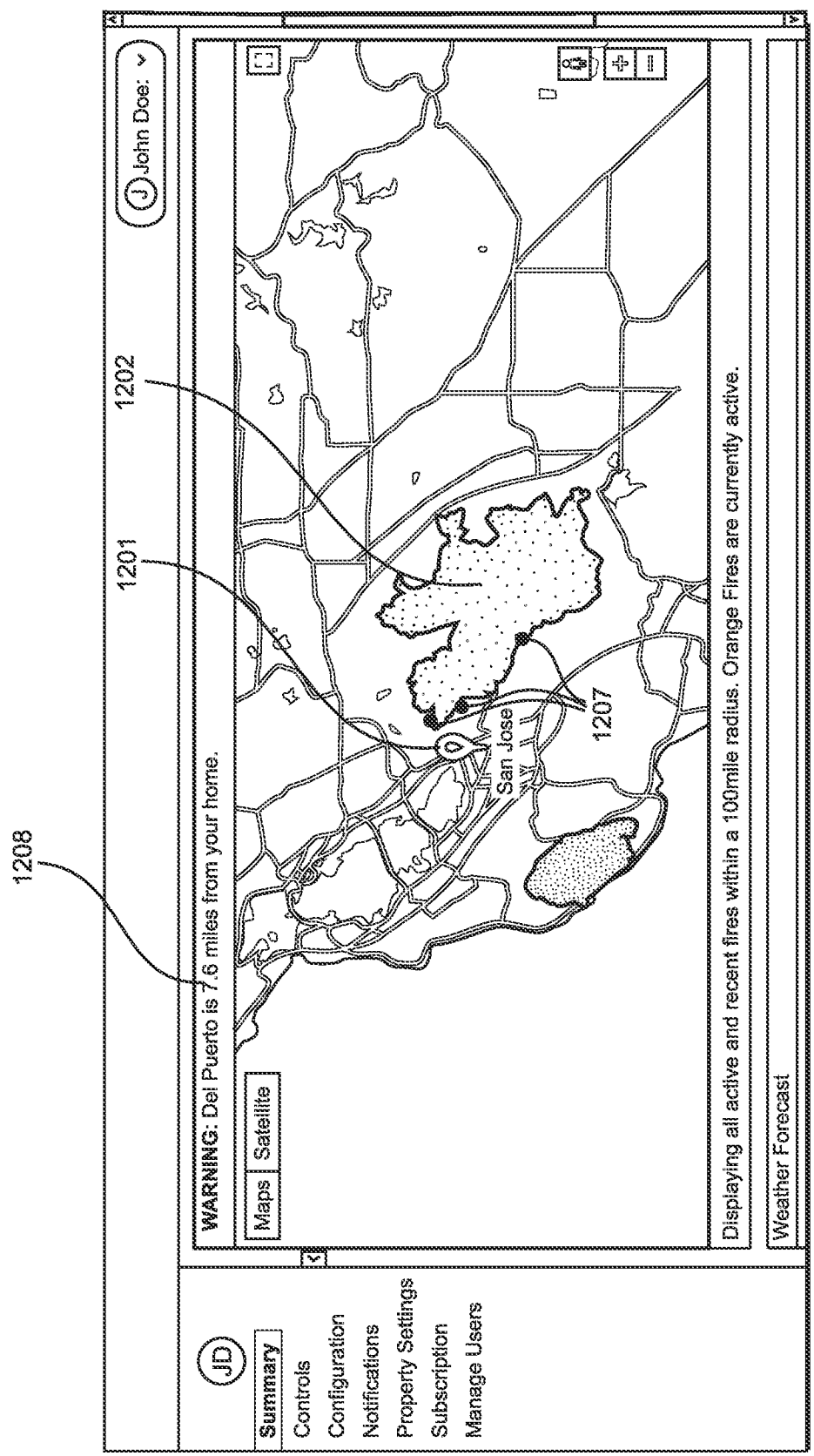
FIG. 12G is a view of an overview page of a remote user portal used by the structure and curtilage protection system according to an embodiment of the invention.

FIGS. 12E-12G illustrate a summary page whereby the system 100 is tracking fires local to a logged in user's structure 135 and the user may view current and updated information regarding those fires. FIG. 12E shows a logged in user's structure 135 represented by a pin 1201. The pin 1201 may represent the geographic location of a user's structure 135 participating in the system 100. Also shown are surrounding active fires 1202 and inactive fires 1203 relative to the structure's 135 pinned location 1201. A user may click on any fire to view more specific fire details 1204. Also displayed may be relevant overview details 1205 including a user's connectivity, a user's last connection information, the most current threat level, and the time of the most recent update. Should a user wish to navigate to another area of the user control portal 1100 they may use a navigation menu 1206 to do so. By way of non-limiting example, the navigation menu may include a means to access the summary page, a controls page, a configuration page, a notifications page, a property settings page, a subscription page, and a user management page.

The controls page, configuration page, and property setting page may all be a means for a user to manually adjust or override the preprogrammed settings for their structure 135. The notifications page may display current threat level information and any other relevant information regarding a participating structure 135. The subscription page and user management pages may allow for administrative functionality of a user's participation within the system 100.

As FIG. 12F illustrates, the active fires 1202 may be tracked as they approach a pinned location 1201. In this particular example, three geographic data positioning points 1207 have been used to determine an active fire's 1202 distance from a pinned location 1201. The user control portal may be structured to calculate and display current hazard threats and their distance from a logged in user's structure 135 utilizing the pinned location 1201 and the geographic data positioning points 1207. Therefore, the hazard dimensions and location are updated and displayed on a user viewable map 1215 within the user control portal 1100. As shown by the warning 1208, the named fire is ten miles from the pinned location in this example. The overview information 1205 has been updated with the system status, last chemically infused water usage, and other current system information.

Also shown may be weather 1209 surrounding a pinned location 1201. Weather may be particularly relevant in monitoring active fires 1202 to further assess a fire's threat level. Conditions such as whether it has rained or will rain, wind direction and speed, humidity, etc. all may assist with determining the severity of a threat. In some embodiments, the user control portal 1100 may include weather conditions in its evaluation and categorization of a threat level for system action or inaction. By way of non-limiting example, if a fire is 10 miles away it may not register as a threat under normal circumstances. However, in some embodiments and by way of non-limiting example, if the user control portal 1100 determines that it has not rained in thirty days by examining weather history, determines that the wind is currently blowing toward a pinned location 1201 at fifteen miles an hour, it may adjust the threat level from a level 0 to a level 1 even though a fire is not within the preprogrammed distance for level 1.

FIG. 12G emphasizes that the user control portal 1100 uses an algorithmic determination based on an average of at least three geographic data positioning points 1207 to determine the distance of an active fire 1202 relative to a pinned location 1201. In this instance, the user control portal 1100 has determined that the active fire 1202 has moved toward the pinned location 1201 and is now only 7.6 miles away. The warning 1208 has been updated accordingly.

That which is claimed is:

1. An automated structure and curtilage protection system comprising
   a mechanical system hub, wherein the mechanical system hub comprises a control center, a pump, a pressure tank, a plurality of controllable valves, and a chemical injector assembly;
   a piped network;
   a plurality of spray nozzles; and
   a remote user control portal, wherein the remote user control portal is configured to calculate a hazard distance by averaging a plurality of known data positioning points of a hazard relative to a structure, categorize the calculated hazard distance into a categorized threat level within a hierarchy of preprogrammed threat levels and actuate the mechanical system hub based on an instruction set corresponding to the categorized threat level within the hierarchy of preprogrammed threat levels;
   wherein the automated structure and curtilage protection system is configured to autonomously take system action depending on the categorized threat level within the hierarchy of preprogrammed threat levels;
   wherein the automated structure and curtilage protection system is configured to autonomously deliver water at set time intervals onto the structure and curtilage when instruction sets corresponding to at least a first set of categorized threat levels within the hierarchy of preprogrammed threat levels have been activated;
   wherein the automated structure and curtilage protection system is configured to autonomously deliver chemically infused water onto only the curtilage for a set time interval when instruction sets corresponding to a categorized threat level within the hierarchy of preprogrammed threat levels that is not in the first set of categorized threat levels has been activated.

2. The automated structure and curtilage protection system of claim 1 wherein the pump is a variable speed pump configured to maintain, increase and decrease water pressure throughout the system depending on the categorized threat level within the hierarchy of preprogrammed threat levels.

3. The automated structure and curtilage protection system of claim 1 wherein the system further comprises at least one of:
   a plurality of spray nozzle housings configured to support and protect the plurality of spray nozzles on the flat surface of a roof; and
   an M-Shaped flashing configured to secure a segment of the piped network on the ridge of a pitched roof while allowing the plurality of spray nozzles to extend through the exterior surface of the pitched roof ridge at an angle.

4. The automated structure and curtilage protection system of claim 1 wherein the mechanical system hub further includes at least one of a backup generator, a solar storage battery, and smart switch configured to transition the mechanical system hub to a backup power source.

5. The automated structure and curtilage protection system of claim 1 wherein the control center is configured to manage at least one pump and at least one controllable valve within the mechanical system hub to direct water through the piped network; and wherein the control center is preprogrammed to route water through different tracks of the piped network depending on the categorized threat level within the hierarchy of preprogrammed threat levels; and wherein the control center is configured to receive threat level activation instructions from a remote source.

6. The automated structure and curtilage protection system of claim 1 wherein the control center comprises a user interface configured to allow a user to override preprogrammed control center settings.

7. The automated structure and curtilage protection system of claim 1 wherein the remote user control portal is configured to provide remote system overrides, monitor and display local fire conditions, and communicate categorized threat levels to a participating control center for system action and inaction based on the categorized threat levels.

8. The automated structure and curtilage protection system of claim 1 wherein the piped network is at least one of:
   infused into the interior wall and roof construction of a new structure; and
   fixedly attached to an existing structure exterior; and wherein the automated structure and curtilage protection system further includes faux gutter housing along a structure's walls and top hat pipe covering along an existing structure's roof configured to match a structure's aesthetic features and conceal the piped network.

9. The automated structure and curtilage protection system of claim 1 wherein the control center is configured to keep all system valves closed when an initial categorized threat level indicating an absence of threat has been communicated to the control center;

open a first set of piped network valves within the mechanical system hub to autonomously deliver water to a structure's roof, eaves and curtilage when a first through third categorized threat level, fourth categorized threat sub level, and fifth categorized threat level have been communicated to the control center; and close the first set of piped network valves and open a second set of piped network valves within the mechanical system hub to autonomously deliver chemically infused water to only the curtilage when an alternate fourth sub level has been communicated to the control center.

10. An automated structure and curtilage protection system comprising
a mechanical system hub comprising
a control center,
a pump,
a pressure tank,
a plurality of automated valves, and
a chemical injector assembly;
a piped network comprising
the plurality of automated valves configured to create a first track operable to autonomously deliver only water to a structure's roof, eaves and curtilage; and
the plurality of automated valves configured to create a second track operable to autonomously deliver only chemically infused water solely to the curtilage;
a plurality of spray nozzles; and
a remote user control portal, wherein the remote user control portal is configured to calculate a hazard distance by averaging a plurality of known data positioning points of a hazard relative to a structure, categorize the calculated hazard distance into a categorized threat level within a hierarchy of preprogrammed threat levels and actuate the mechanical system hub based on an instruction set corresponding to the categorized threat level within the hierarchy of preprogrammed threat levels;
wherein the automated structure and curtilage protection system is configured to take system action depending on the hierarchy of preprogrammed threat levels;
wherein the automated structure and curtilage protection system is configured to autonomously deliver water at set time intervals onto the structure and curtilage when instruction sets corresponding to at least a first set of categorized threat levels of the hierarchy of preprogrammed threat levels have been activated;
wherein the automated structure and curtilage protection system is configured to autonomously deliver chemically infused water solely to the curtilage for a set time interval when instruction sets corresponding to at least one categorized threat level of the hierarchy of preprogrammed threat levels that is not in the first set of categorized threat levels have been activated; and
wherein the control center and the remote user control portal are configured to manually override any instruction sets preprogrammed into the automated structure and curtilage protection system.

11. The automated structure and curtilage protection system of claim 10, wherein the hazard dimensions and location are updated and displayed on a user accessible map within the remote user control portal.

12. The automated structure and curtilage protection system of claim 10 wherein the remote user control portal is configured to provide a constant web based monitor of the hazard and categorized threat level and is operable to alert users of current threat levels via at least one of text message, automated phone calls, email, and user login.

13. The automated structure and curtilage protection system of claim 10 wherein
the user control portal is configured to calculate the absence of a hazard, categorize the absence of hazard into an initial threat level, and transmit the corresponding threat level and instruction set to the control center to direct the plurality of automated valves closed;
wherein the user control portal is configured to determine a first threat level based on the calculated distance of the hazard from the structure as compared to a threshold distance, and transmit the corresponding threat level and instruction set to the control center to direct open a section of the plurality of valves along the first track and guide water therethrough for a set duration at set time intervals;
wherein the user control portal is configured to determine a second threat level based on the calculated distance of the hazard from the structure as compared to a second threshold distance, and transmit the corresponding threat level and instruction set to the control center to guide water along the first track for an increased duration at increased time intervals relative to the first level;
wherein the user control portal is configured to determine a third threat level based on the calculated distance of the hazard from the structure as compared to a third threshold distance, and transmit the corresponding threat level and instruction set to the control center to guide water along the first track for an increased duration at increased time intervals relative to the second level;
wherein the user control portal is configured to determine an initial fourth threat sublevel based on the calculated distance of the hazard from the structure as compared to a fourth threshold distance, and transmit the corresponding threat level and instruction set to the control center to close the first track valves, open a section of the plurality of valves establishing the second track to guide chemically infused water therethrough for a single continuous predetermined period of time;
wherein the user control portal is configured to determine a subsequent fourth threat sublevel based on the calculated distance of the hazard from the structure as compared to the fourth threshold distance, determine the initial fourth threat sublevel action has terminated, and transmit the corresponding threat level and instruction set to the control center to close the second track valves, open the first track valves, and guide water along the first track for an increased duration at increased time intervals relative to the third level;
wherein the user control portal is configured to determine a fifth threat level based on the calculated distance of the hazard from the structure as compared to a fifth threshold distance, and transmit the corresponding threat level and instruction set to the control center to guide water along the first track for the longest duration of time relative to all other levels.

14. The automated structure and curtilage protection system of claim 10 wherein the control center comprises a cellular module configured to send and receive categorized threat level information relative to the structure and initiate an action or inaction based on the instruction set corresponding to the categorized threat level; and wherein the cellular module is configured to operate independently of a structure's internet source.

15. The automated structure and curtilage protection system of claim 10 wherein the user control portal is configured to
calculate and categorize a first threat level by averaging at least three distance points from a known active fire relative to the structure and comparing the average to a five-mile radius from the structure;
calculate and categorize a second threat level by averaging at least three distance points from a known active fire relative to the structure and comparing the average to a four-mile radius from the structure;
calculate and categorize a third threat level by averaging at least three distance points from a known active fire relative to the structure and comparing the average to a three-mile radius from the structure;
calculate and categorize fourth threat levels by averaging at least three distance points from a known active fire relative to the structure and comparing the average to a two-mile radius from the structure;
calculate and categorize a fifth threat level by averaging at least three distance points from a known active fire relative to the structure and comparing the average to a distance equal to or less than a one-mile radius from the structure.

16. The automated structure and curtilage protection system of claim 10 wherein the plurality of spray nozzles comprises at least one of
a first set of spray nozzles fixedly attached to a pitched roof extending through the exterior surface of the pitched roof ridge at an angle;
a second set of retractable spray nozzles surrounded by spray nozzle housings configured to support and protect the retractable spray nozzles;
a third set of retractable spray nozzles positioned on a structure's curtilage; and
a fourth set of spray nozzles positioned underneath a structure's eaves.

17. The automated structure and curtilage protection system of claim 10 wherein the control center comprises an antenna, ventilation apertures, ventilation covers, a user interface, a power supply, circuit protectors, a distribution block, control relays, terminal blocks, at least one motor, and a disconnect switch.

18. The automated structure and curtilage protection system of claim 17 wherein the antenna is configured to receive instruction sets from the user control portal and transmit those instruction sets to a controller for processing by the control center; and wherein the control relays are configured to actuate the at least one motor and the automated valves to guide water through at least one of the first track and the second track depending on instructions received from the instruction sets.

19. An automated structure and curtilage protection system comprising
a participating structure's mechanical system hub comprising
a participating structure's control center with at least one antenna, ventilation apertures, ventilation covers, a user interface, a power supply, circuit protectors, a distribution block, control relays, terminal blocks, and at least one motor,
a pump,
a pressure tank,
a plurality of automated valves, and
a chemical injector assembly;
a piped network comprising
the plurality of automated valves configured to create a first track operable to autonomously deliver only water to a structure's roof, eaves and curtilage; and
the plurality of automated valves configured to create a second track operable to autonomously deliver only chemically infused water solely to the curtilage;
a plurality of spray nozzles; and
a remote user control portal, wherein the remote user control portal is configured to calculate a hazard distance by averaging a plurality of known data positioning points of a hazard relative to a structure, categorize the calculated hazard distance into a categorized threat level within a hierarchy of preprogrammed threat levels and actuate the mechanical system hub based on an instruction set corresponding to the categorized threat level within the hierarchy of preprogrammed threat levels; and
wherein the automated structure and curtilage protection system is configured to take system action depending on a hierarchy of preprogrammed threat levels;
wherein the automated structure and curtilage protection system is configured to autonomously deliver water at set time intervals onto the structure and curtilage when instruction sets corresponding to at least a first set of categorized threat levels of the hierarchy of preprogrammed threat levels have been activated;
wherein the automated structure and curtilage protection system is configured to autonomously deliver chemically infused water solely to the curtilage for a set time interval when instruction sets corresponding to at least one categorized threat level of the hierarchy of preprogrammed threat levels that is not in the first set of categorized threat levels have been activated;
wherein the participating structure's control center and the remote user control portal are configured to have a user manually override any instruction sets preprogrammed into the automated structure and curtilage protection system;
wherein the at least one antenna is configured to receive instruction sets from the user control portal and transmit those instruction sets to a controller for processing by the participating structure's control center;
wherein the control relays are configured to actuate the at least one motor and the automated valves to guide water through at least one of the first track and the second track depending on instructions received from the instruction sets;
wherein the participating structure's control center is configured to
keep all automated valves closed when an initial threat level indicating an absence of threat has been communicated to the participating structure's control center;
open a first set of automated valves within the participating structure's mechanical system hub to autonomously deliver water to a structure's roof, eaves and curtilage when a first through third level, fourth sub level, and fifth level of threat have been communicated to the participating structure's control center; and close the first set of automated valves and open a second set of automated valves within the participating structure's mechanical system hub to autonomously deliver chemically infused water solely to the curtilage when an alternate fourth sub level has been communicated to the participating structure's control center.

20. The automated structure and curtilage protection system of claim 19 wherein the system is configured to direct water within the piped network at a higher psi through the first track and lower psi through the second track.

\* \* \* \* \*